US012696247B2

(12) United States Patent
Liu et al.

(10) Patent No.: US 12,696,247 B2
(45) Date of Patent: Jul. 28, 2026

(54) TECHNIQUES FOR SIDELINK FEEDBACK CHANNEL SLOT FORMAT FOR MINI-SLOT CHANNEL ACCESS

(71) Applicant: QUALCOMM Incorporated, San Diego, CA (US)

(72) Inventors: Chih-Hao Liu, San Diego, CA (US); Giovanni Chisci, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 541 days.

(21) Appl. No.: 18/325,716

(22) Filed: May 30, 2023

(65) Prior Publication Data

US 2024/0057047 A1 Feb. 15, 2024

Related U.S. Application Data

(60) Provisional application No. 63/371,199, filed on Aug. 11, 2022.

(51) Int. Cl.
*H04W 72/0446* (2023.01)
*H04L 5/00* (2006.01)
(Continued)

(52) U.S. Cl.
CPC ....... *H04W 72/0446* (2013.01); *H04L 5/0053* (2013.01); *H04W 72/25* (2023.01); *H04W 72/40* (2023.01)

(58) Field of Classification Search
CPC .. H04W 72/25; H04W 72/40; H04W 72/0446
See application file for complete search history.

(56) References Cited

U.S. PATENT DOCUMENTS

2023/0354268 A1\* 11/2023 Zhou ..................... H04L 5/0048
2024/0129936 A1\* 4/2024 Ganesan ............... H04W 72/40
(Continued)

FOREIGN PATENT DOCUMENTS

WO WO-2021262897 A1 12/2021

OTHER PUBLICATIONS

R1-1902287, "On Sidelink Feedback Channel Format", Feb. 25-Mar. 1, 2019 (Year: 2019).\*
(Continued)

*Primary Examiner* — Salvador E Rivas
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive an indication of a sidelink slot format, wherein the sidelink slot format indicates a configuration of sidelink feedback resources. The UE may measure a signal, associated with a channel access procedure, after a first symbol of a first sidelink slot and prior to a mini-slot of the first sidelink slot, and wherein the sidelink slot format indicates that the first sidelink slot is associated with the sidelink feedback resources. The UE may transmit, using a transmission starting location of the mini-slot or of a symbol of a second sidelink slot, a sidelink communication based at least in part on the measurement of the signal, wherein a format of the sidelink feedback resources is based at least in part on the transmission starting location. Numerous other aspects are described.

30 Claims, 15 Drawing Sheets

1000 ⟶

1010 ~ Receive an indication of a sidelink slot format, wherein the sidelink slot format indicates a configuration of sidelink feedback resources, and wherein the sidelink slot format is associated with a plurality of starting locations for a sidelink communication 1020 ~ Measure a signal associated with a channel access procedure, wherein the measurement of the signal indicates that the UE is permitted to access a sidelink channel, wherein the measurement of the signal occurs after a first symbol of a first sidelink slot and prior to a mini-slot of the first sidelink slot, and wherein the sidelink slot format indicates that the first sidelink slot is associated with the sidelink feedback resources 1030 ~ Transmit, using a transmission starting location of the mini-slot of the first sidelink slot or of a symbol of a second sidelink slot, a sidelink communication based at least in part on the measurement of the signal, wherein a format of the sidelink feedback resources is based at least in part on the transmission starting location

(51) Int. Cl.
     H04W 72/25          (2023.01)
     H04W 72/40          (2023.01)

(56)                  References Cited

U.S. PATENT DOCUMENTS

| 2024/0284515 A1* | 8/2024 | Miao | H04L 27/0006 |
| 2024/0349252 A1* | 10/2024 | Ding | H04L 5/0055 |
| 2025/0126646 A1* | 4/2025 | Selvanesan | H04W 74/0808 |

OTHER PUBLICATIONS

M. Harounabadi, D. M. Soleymani, S. Bhadauria, M. Leyh and E. Roth-Mandutz, "V2X in 3GPP Standardization: NR Sidelink in Release-16 and Beyond," in IEEE Communications Standards Magazine, vol. 5, No. 1, pp. 12-21, Mar. 2021, doi: 10.1109/MCOMSTD.001.2000070. (Year: 2021).*

R1-2204608, "NR Sidelink Unlicensed Physical Channel Design", May 9-20, 2022 (Year: 2022).*

Fraunhofer HHI, et al., "NR Sidelink Unlicensed Physical Channel Design", 3GPP TSG RAN WG1 Meeting #109-e, R1-2204608, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, pp. 1-5, XP052153608, p. 1, paragraph 1 p. 1, paragraph 2 p. 4, paragraph 4, figures 1,2.

Fujitsu: "Discussion On Physical Layer Structure for NR Sidelink", 3GPP TSG RAN WG1 #96, R1-1901943, 3rd Generation Partnership Project, Mobile Competence Centre, 650, Route Des Lucioles, F-06921 Sophia-Antipolis Cedex, France, Feb. 15, 2019, pp. 1-6, XP051599637, p. 1, paragraph 2.1 p. 6, paragraph 3 figures 1-3.

International Search Report and Written Opinion—PCT/US2023/024007—ISA/EPO—Sep. 22, 2023.

* cited by examiner

900
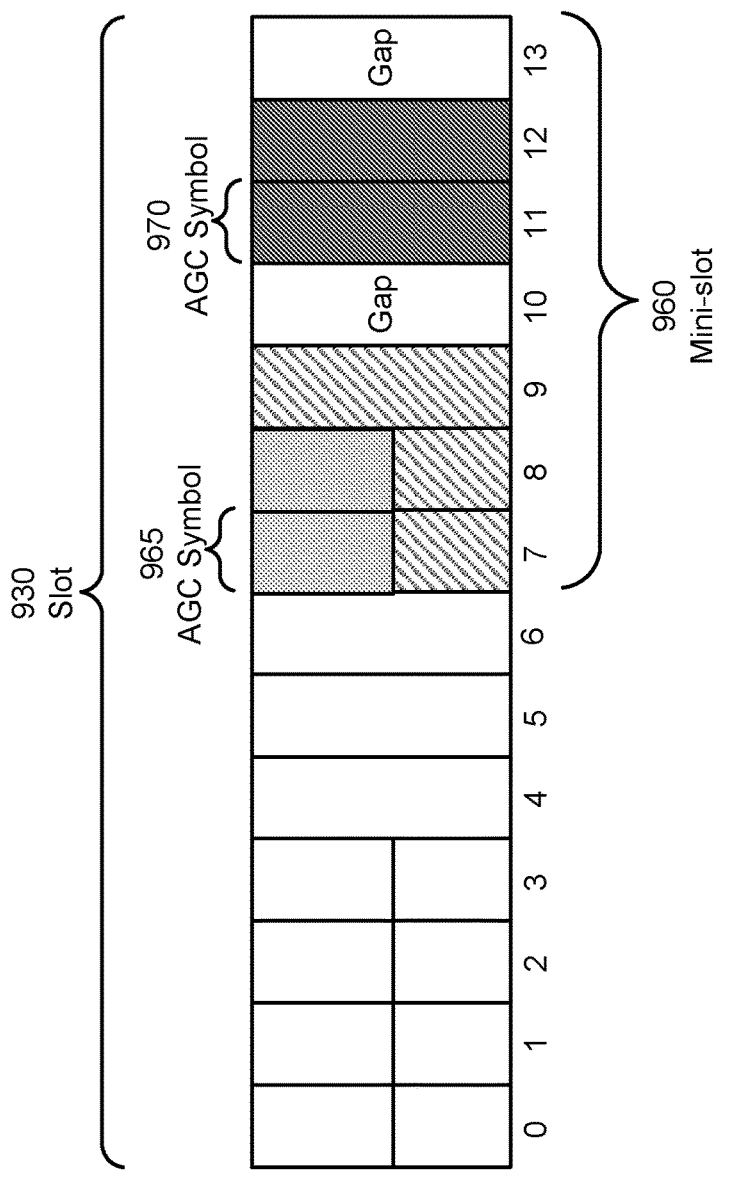
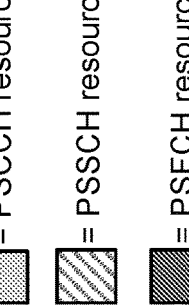
= PSCCH resources
= PSSCH resources
= PSFCH resources
FIG. 9B

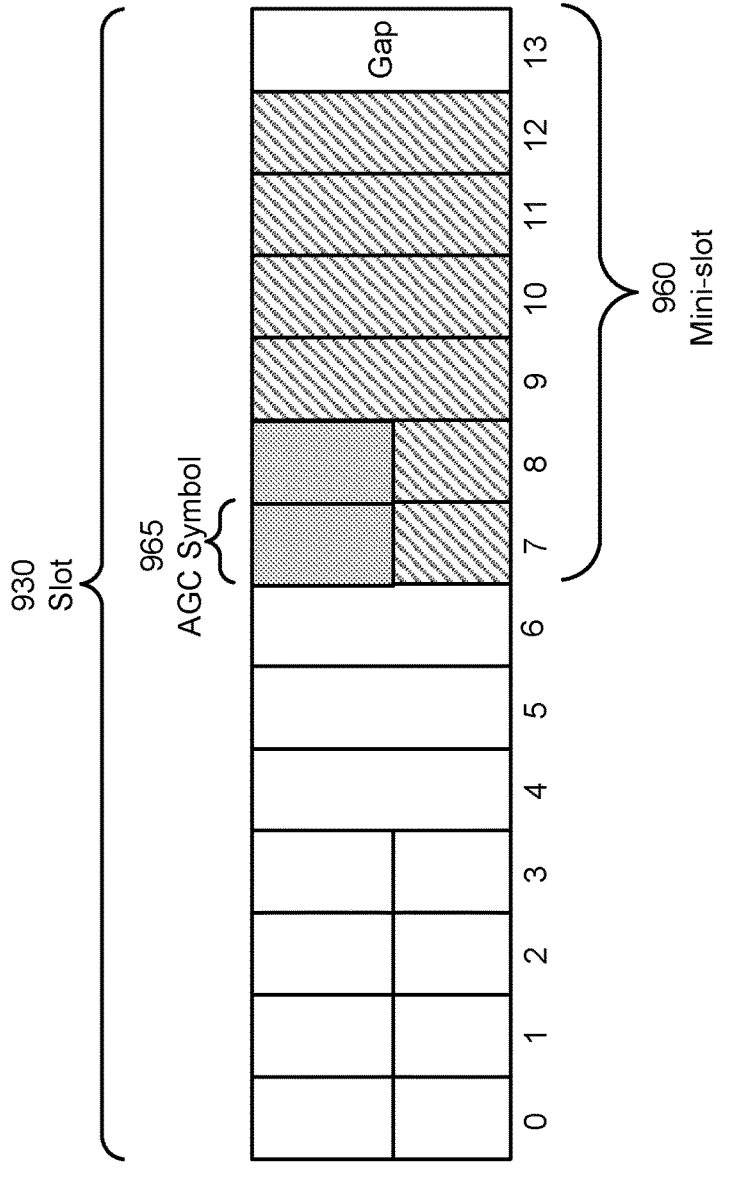
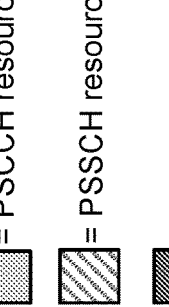
= PSCCH resources
= PSSCH resources
= PSFCH resources
FIG. 9C

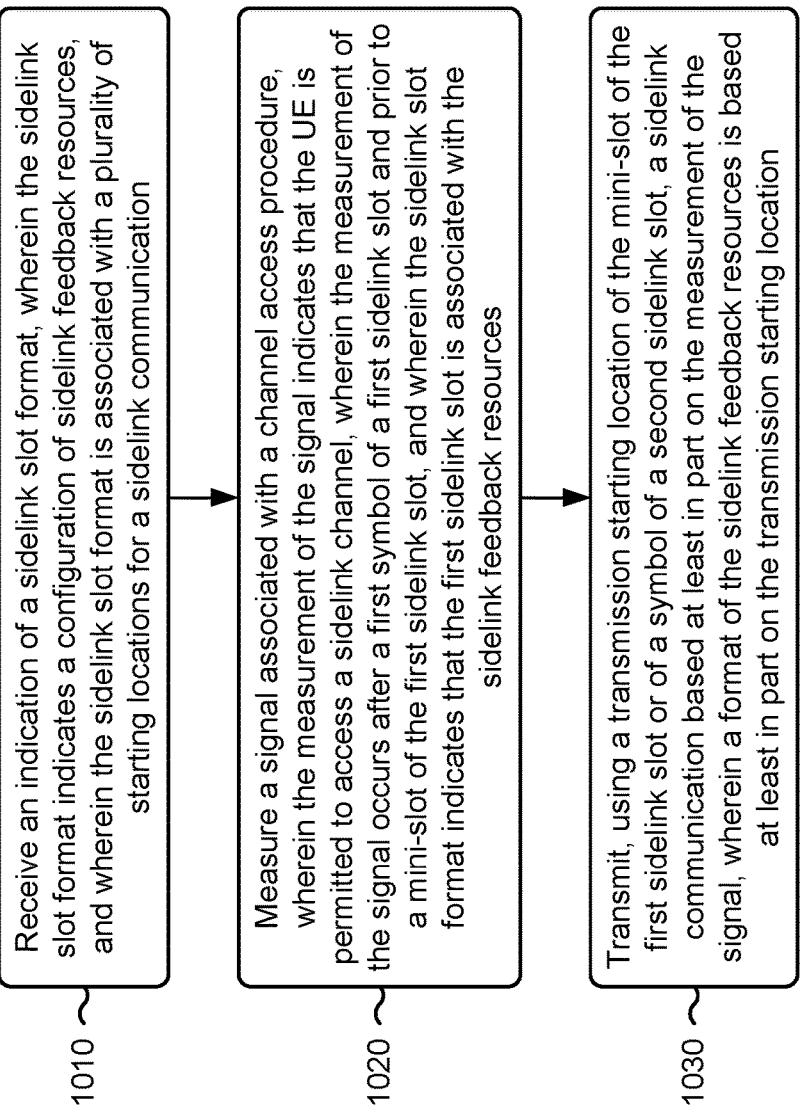

Receive an indication of a sidelink slot format, wherein the sidelink slot format indicates a configuration of sidelink feedback resources, and wherein the sidelink slot format is associated with a plurality of starting locations for a sidelink communication

1010

Measure a signal associated with a channel access procedure, wherein the measurement of the signal indicates that the UE is permitted to access a sidelink channel, wherein the measurement of the signal occurs after a first symbol of a first sidelink slot and prior to a mini-slot of the first sidelink slot, and wherein the sidelink slot format indicates that the first sidelink slot is associated with the sidelink feedback resources

1020

Transmit, using a transmission starting location of the mini-slot of the first sidelink slot or of a symbol of a second sidelink slot, a sidelink communication based at least in part on the measurement of the signal, wherein a format of the sidelink feedback resources is based at least in part on the transmission starting location

TECHNIQUES FOR SIDELINK FEEDBACK CHANNEL SLOT FORMAT FOR MINI-SLOT CHANNEL ACCESS

CROSS-REFERENCE TO RELATED APPLICATION

This Patent Application claims priority to U.S. Provisional Patent Application No. 63/371,199, filed on Aug. 11, 2022, entitled "TECHNIQUES FOR SIDELINK FEEDBACK CHANNEL SLOT FORMAT FOR MINI-SLOT CHANNEL ACCESS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses associated with a sidelink feedback channel slot format for mini-slot channel access.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include receiving an indication of a sidelink slot format, wherein the sidelink slot format indicates a configuration of sidelink feedback resources, and wherein the sidelink slot format is associated with a plurality of starting locations for a sidelink communication. The method may include measuring a signal associated with a channel access procedure, wherein the measurement of the signal indicates that the UE is permitted to access a sidelink channel, wherein the measurement of the signal occurs after a first symbol of a first sidelink slot and prior to a mini-slot of the first sidelink slot, and wherein the sidelink slot format indicates that the first sidelink slot is associated with the sidelink feedback resources. The method may include transmitting, using a transmission starting location of the mini-slot of the first sidelink slot or of a symbol of a second sidelink slot, a sidelink communication based at least in part on the measurement of the signal, wherein a format of the sidelink feedback resources is based at least in part on the transmission starting location.

Some aspects described herein relate to a UE for wireless communication. The UE may include one or more memories and one or more processors coupled to the one or more memories. The one or more processors may be configured to receive an indication of a sidelink slot format, wherein the sidelink slot format indicates a configuration of sidelink feedback resources, and wherein the sidelink slot format is associated with a plurality of starting locations for a sidelink communication. The one or more processors may be configured to measure a signal associated with a channel access procedure, wherein the measurement of the signal indicates that the UE is permitted to access a sidelink channel, wherein the measurement of the signal occurs after a first symbol of a first sidelink slot and prior to a mini-slot of the first sidelink slot, and wherein the sidelink slot format indicates that the first sidelink slot is associated with the sidelink feedback resources. The one or more processors may be configured to transmit, using a transmission starting location of the mini-slot of the first sidelink slot or of a symbol of a second sidelink slot, a sidelink communication based at least in part on the measurement of the signal, wherein a format of the sidelink feedback resources is based at least in part on the transmission starting location.

Some aspects described herein relate to a non-transitory computer-readable medium that stores a set of instructions for wireless communication by a UE. The set of instructions, when executed by one or more processors of the UE, may cause the UE to receive an indication of a sidelink slot format, wherein the sidelink slot format indicates a configuration of sidelink feedback resources, and wherein the sidelink slot format is associated with a plurality of starting locations for a sidelink communication. The set of instructions, when executed by one or more processors of the UE, may cause the UE to measure a signal associated with a channel access procedure, wherein the measurement of the signal indicates that the UE is permitted to access a sidelink channel, wherein the measurement of the signal occurs after a first symbol of a first sidelink slot and prior to a mini-slot of the first sidelink slot, and wherein the sidelink slot format indicates that the first sidelink slot is associated with the sidelink feedback resources. The set of instructions, when executed by one or more processors of the UE, may cause the UE to transmit, using a transmission starting location of the mini-slot of the first sidelink slot or of a symbol of a second sidelink slot, a sidelink communication based at least in part on the measurement of the signal, wherein a format of the sidelink feedback resources is based at least in part on the transmission starting location.

Some aspects described herein relate to an apparatus for wireless communication. The apparatus may include means for receiving an indication of a sidelink slot format, wherein the sidelink slot format indicates a configuration of sidelink feedback resources, and wherein the sidelink slot format is associated with a plurality of starting locations for a sidelink communication. The apparatus may include means for measuring a signal associated with a channel access procedure, wherein the measurement of the signal indicates that the apparatus is permitted to access a sidelink channel, wherein the measurement of the signal occurs after a first symbol of a first sidelink slot and prior to a mini-slot of the first sidelink slot, and wherein the sidelink slot format indicates that the first sidelink slot is associated with the sidelink feedback resources. The apparatus may include means for transmitting, using a transmission starting location of the mini-slot of the first sidelink slot or of a symbol of a second sidelink slot, a sidelink communication based at least in part on the measurement of the signal, wherein a format of the sidelink feedback resources is based at least in part on the transmission starting location.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9A-9D are diagrams of an example associated with a sidelink feedback channel slot format for mini-slot channel access, in accordance with the present disclosure.

FIG. 10 is a diagram illustrating an example process performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
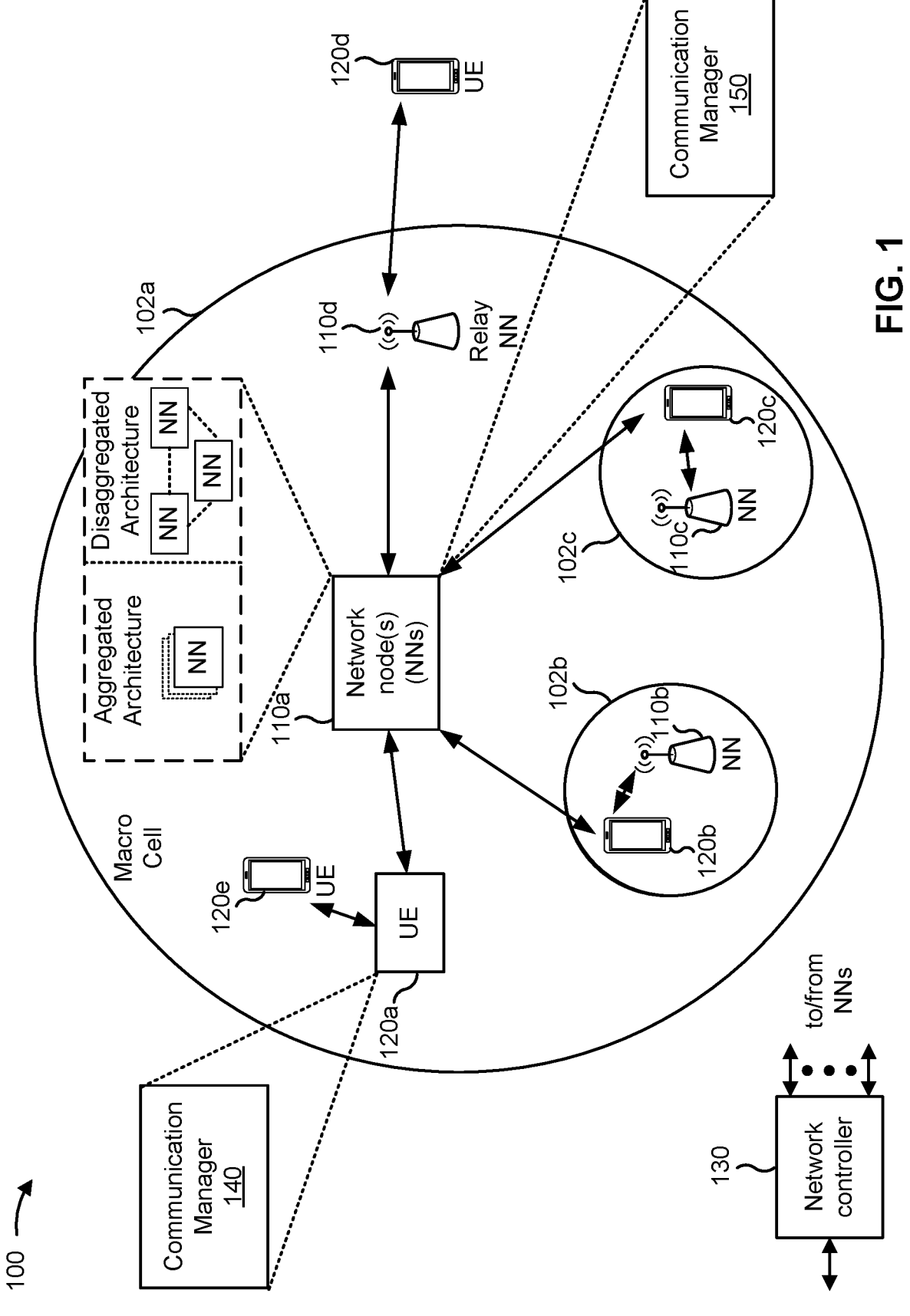
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive an indication of a sidelink slot format, wherein the sidelink slot format indicates a configuration of sidelink feedback resources, and wherein the sidelink slot format is associated with a plurality of starting locations for a sidelink communication; measure a signal associated with a channel access procedure, wherein the measurement of the signal indicates that the UE is permitted to access a sidelink channel, wherein the measurement of the signal occurs after a first symbol of a first sidelink slot and prior to a mini-slot of the first sidelink slot, and wherein the sidelink slot format indicates that the first sidelink slot is associated with the sidelink feedback resources; and transmit, using a transmission starting location of the mini-slot of the first sidelink slot or of a symbol of a second sidelink slot, a sidelink communication based at least in part on the measurement of the signal, wherein a format of the sidelink feedback resources is based at least in part on the transmission starting location. Additionally, or alternatively, the communication manager 140 may perform one or more other operations described herein.

In some aspects, the network node 110 may include a communication manager 150. As described in more detail elsewhere herein, the communication manager 150 may transmit an indication of a sidelink slot format, wherein the sidelink slot format indicates a configuration of sidelink feedback resources, and wherein the sidelink slot format is associated with a plurality of starting locations for a sidelink communication; and/or determine a format of the sidelink feedback resources when a mini-slot is used in a slot that includes the sidelink feedback resources. Additionally, or alternatively, the communication manager 150 may perform one or more other operations described herein.

As indicated above, FIG. 1 is provided as an example. Other examples may differ from what is described with regard to FIG. 1.

Figure 2:
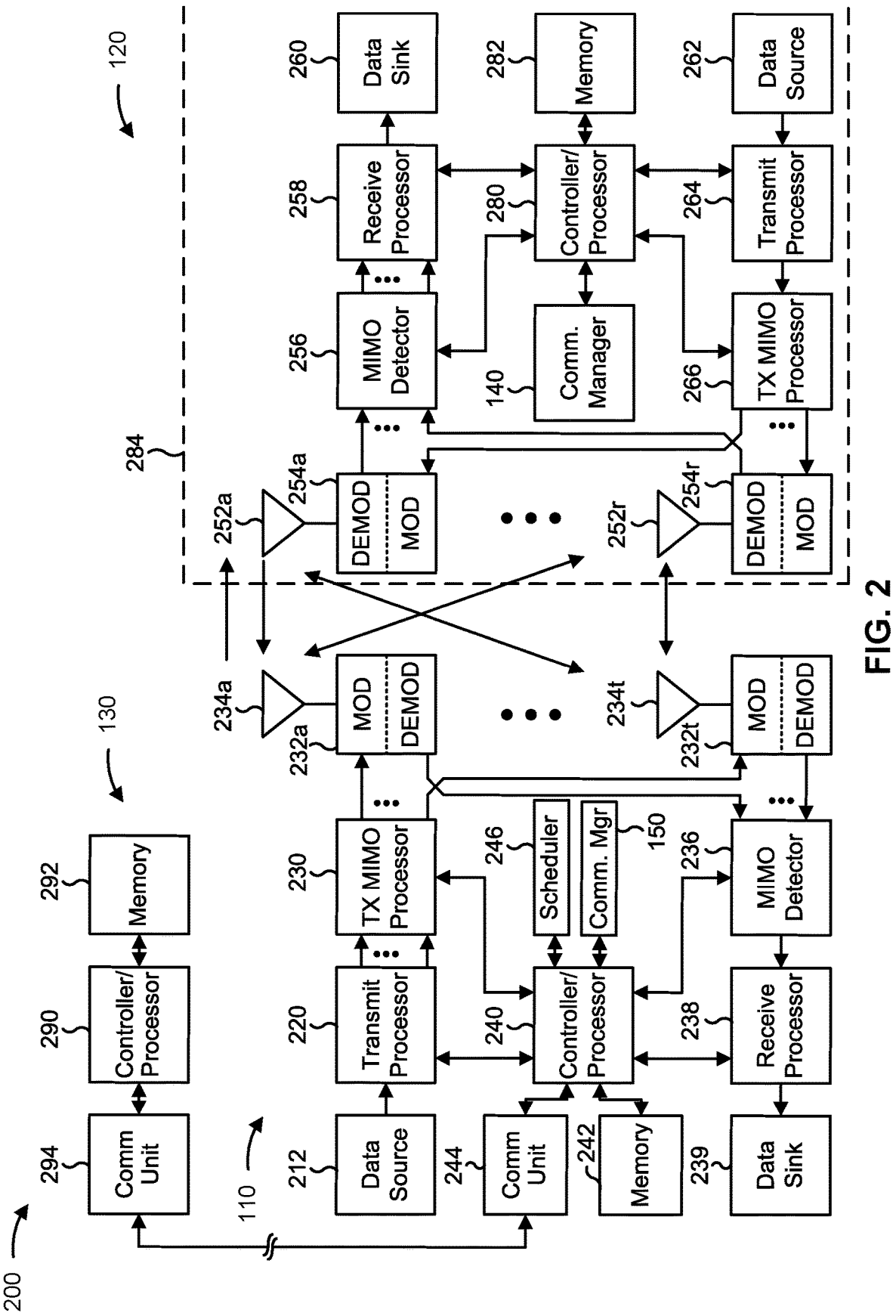
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCS s) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX)

multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 9A-9D, 10, 11, and 12).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 9A-9D, 10, 11, and 12).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with a sidelink feedback channel slot format for mini-slot channel access, as described in more detail elsewhere herein. For example, the controller/processor 240 of the network node 110, the controller/processor 280 of the UE 120, or any other component(s) (or combinations of components) of FIG. 2 may perform or direct operations of, for example, process 1000 of FIG. 10, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving an indication of a sidelink slot format, wherein the sidelink slot format indicates a configuration of sidelink feedback resources, and wherein the sidelink slot format is associated with a plurality of starting locations for a sidelink communication; means for measuring a signal associated with a channel access procedure, wherein the measurement of the signal indicates that the UE is permitted to access a sidelink channel, wherein the measurement of the signal occurs after a first symbol of a first sidelink slot and prior to a mini-slot of the first sidelink slot, and wherein the sidelink slot format indicates that the first sidelink slot is associated with the sidelink feedback resources; and/or means for transmitting, using a transmission starting location of the mini-slot of the first sidelink slot or of a symbol of a second sidelink slot, a sidelink communication based at least in part on the measurement of the signal, wherein a format of the sidelink feedback resources is based at least in part on the transmission starting location. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
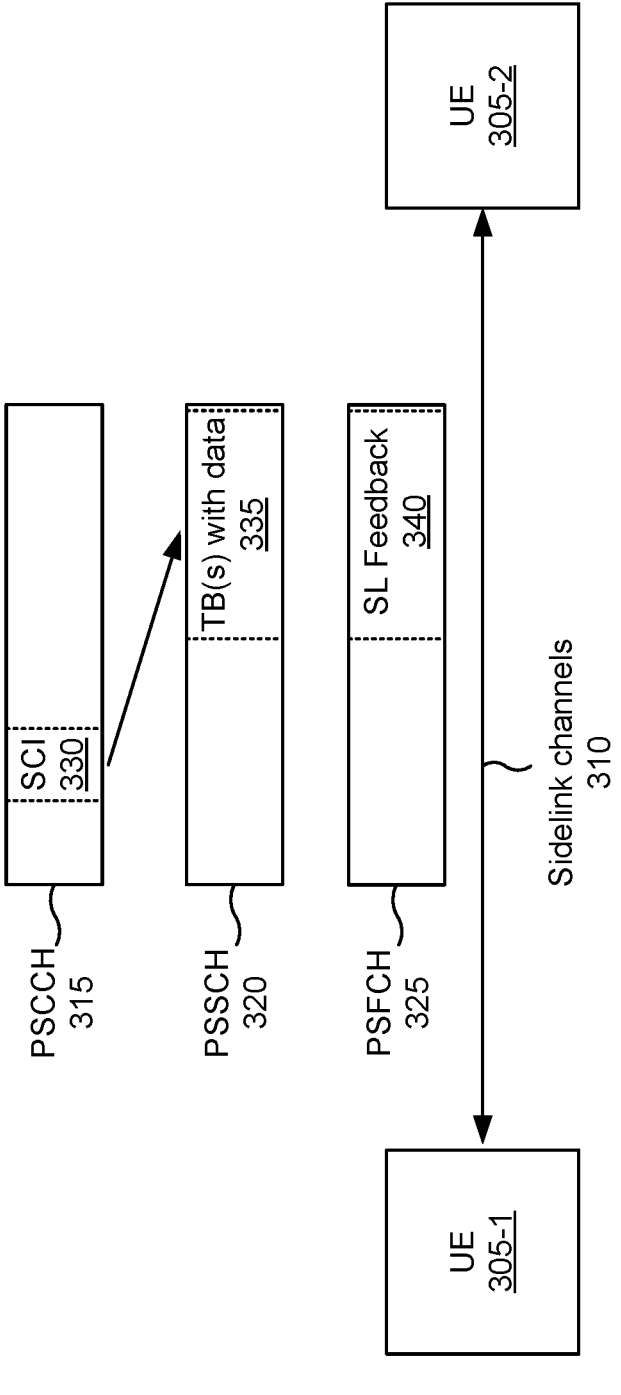
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement (ACK) or negative acknowledgement (NACK) (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a number of PSSCH DMRS ports, and/or an MCS. The SCI-2 may include information associated with data transmissions on the PSSCH 320, such as a HARQ process identifier (ID), a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink resource allocation mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a resource allocation mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the resource allocation mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TB s 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some examples, sidelink communications may be associated with slot-based scheduling. Slot-based scheduling may use a slot as a minimum time unit for resource scheduling in the time domain (for example, a minimum amount of time that can be reserved for a sidelink communication is a slot). In some other examples, sidelink communications may be associated with mini-slot-based scheduling, which may also be referred to as multiple starting position (or multiple starting location) based scheduling. A mini-slot may include a lesser number of symbols than a number of OFDM symbols included in a slot. For example, a starting location of a mini-slot may occur 1, 2, 4, 7, or another number of OFDM symbols after a start of a slot. A mini-slot may be positioned asynchronously with the start of a slot (for example, a start of a mini-slot may not align with a slot boundary). In some other examples, a start of a mini-slot may align with a slot boundary. A mini-slot may be a unit of scheduling that is smaller than a slot (for example, a mini-slot may be a portion of a slot). In some examples, a mini-slot may be referred to as a half-slot (such as where the mini-slot includes one half of a total number of symbols in a slot). In some examples, a mini-slot may include one or more data symbols that represent data. Additionally, or alternatively, the mini-slot may include one or more control symbols that represent control information associated with the mini-slot. In some examples, the one or more control symbols may be at or near a beginning of the mini-slot (for example, in the first two symbols of the mini-slot) or at or near an end of the mini-slot (for example, in the last symbol of the mini-slot). Alternatively, the mini-slot may not include a control symbol.

Using mini-slot-based scheduling for sidelink communications may increase a flexibility for reserving sidelink resources or may reduce a latency associated with sidelink communication. However, mini-slot-based scheduling may be associated with increased signaling overhead because more granular resource reservations may be made, thereby resulting in an increased number of resource reservations being transmitted in the sidelink network.

As indicated above, FIG. 3 is provided as an example. Other examples may differ from what is described with respect to FIG. 3.

Figure 4:
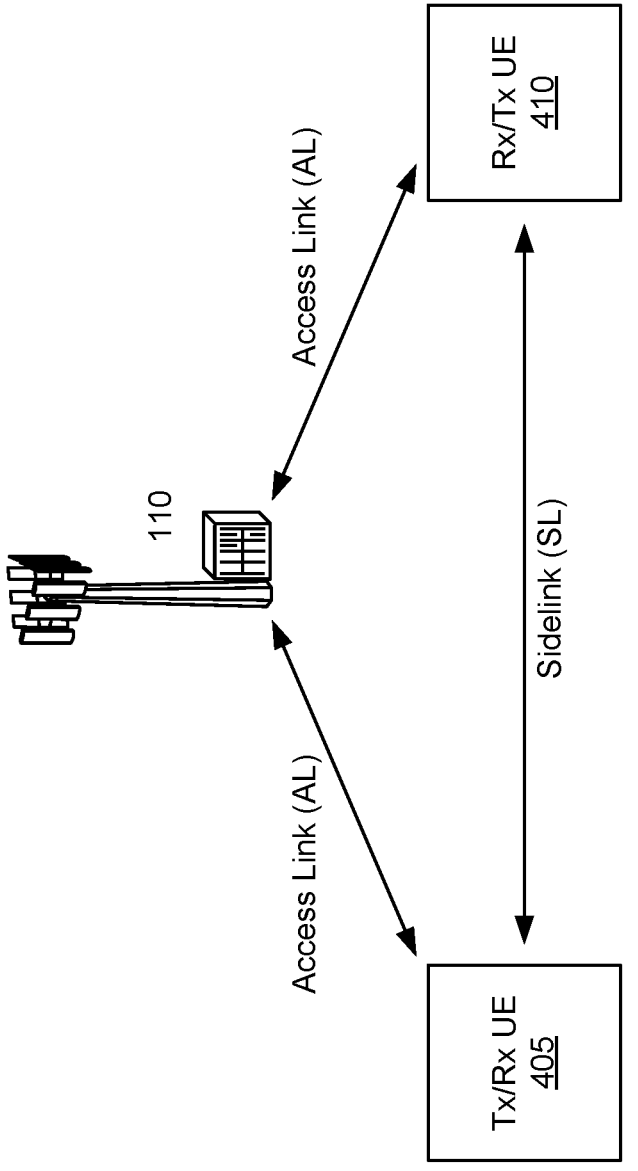
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a network node 110 may communicate with the Tx/Rx UE 405 (e.g., directly or via one or more network nodes), such as via a first access link. Additionally, or alternatively, in some sidelink modes, the network node 110 may communicate with the Rx/Tx UE 410 (e.g., directly or via one or more network nodes), such as via a first access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 4 is provided as an example. Other examples may differ from what is described with respect to FIG. 4.

Figure 5:
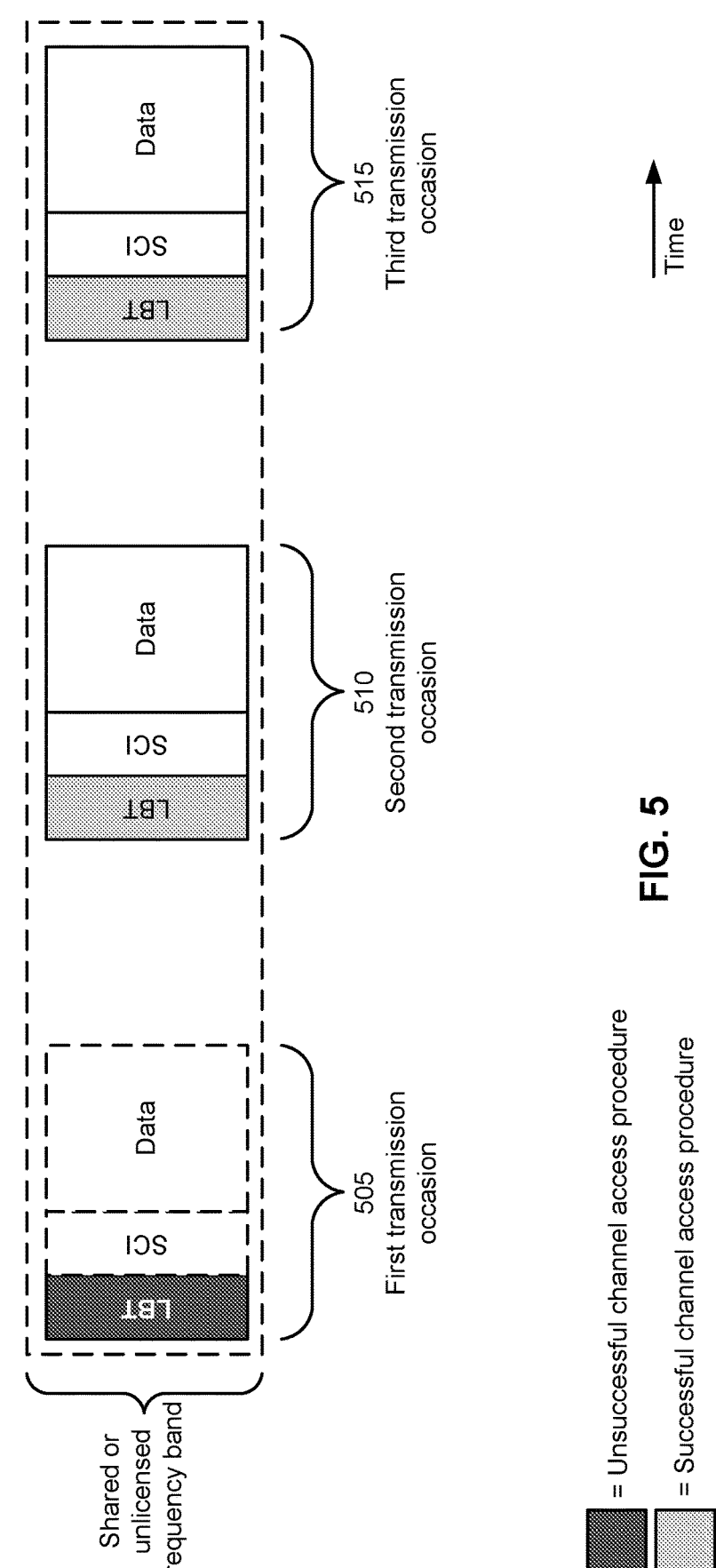
FIG. 5 is a diagram illustrating an example of sidelink communications in a shared or unlicensed frequency band in accordance with the present disclosure.

FIG. 5 is a diagram illustrating an example of sidelink communications 500 in a shared or unlicensed frequency band in accordance with the present disclosure. Various techniques may be used to increase data rates associated with sidelink networks. For example, some wireless networks may support carrier aggregation for sidelink communication. As another example, some wireless networks may support sidelink communications via unlicensed frequency bands or shared frequency bands (e.g., an unlicensed or shared frequency spectrum), thereby providing additional frequency domain resources that are available to be used for sidelink communications. A shared or unlicensed frequency band may be a frequency band that is associated with non-exclusive usage associated with various operators, devices, or RATs, among other examples.

For example, in a shared or unlicensed frequency band, devices using different RATs may communicate using the same frequency band (e.g., the same channel). For the two different type of devices (e.g., using different RATs) to coexist while using a common carrier frequency, there is a need for a mechanism to efficiently utilize resource allocation by the two RATs without negatively impacting the operation of each RAT. For example, in a shared or unlicensed frequency band, a transmitting device may contend against other devices for channel access before transmitting on a shared or unlicensed channel to reduce or prevent collisions on the shared or unlicensed channel. To contend for channel access, the transmitting device may perform a channel access procedure, such as a listen-before-talk (or listen-before-transmit) (LBT) procedure or another type of channel access procedure, for shared or unlicensed frequency band channel access. The channel access procedure may be performed to determine whether the physical channel (e.g., the radio resources of the channel) are free to use or are busy (e.g., in use by another wireless communication device such as a UE, an IoT device, or a wireless local area network (WLAN) device, among other examples).

The channel access procedure may include sensing or measuring the physical channel (e.g., performing an RSRP measurement, detecting an energy level, or performing another type of measurement) during a channel access gap (which may also be referred to as a contention window (CW)) and determining whether the shared or unlicensed channel is free or busy based at least in part on the signals sensed or measured on the physical channel (e.g., based at least in part on whether the measurement satisfies a threshold, such as an energy detection threshold). If the transmitting device determines that the channel access procedure was successful (e.g., if the measurement(s) of the physical channel satisfies the energy detection threshold), then the transmitting device may perform one or more transmissions on the shared or unlicensed channel during a transmission opportunity, which may extend for a channel occupancy time (COT). If the transmitting device determines that the channel access procedure was unsuccessful (e.g., if the measurement(s) of the physical channel do not satisfy the energy detection threshold), then the transmitting device may refrain from performing one or more transmissions on the shared or unlicensed channel.

For example, as shown in FIG. 5, a UE 120 may attempt to transmit a sidelink communication (e.g., sidelink data or a sidelink TB) using a first transmission occasion 505. A transmission occasion may be time-frequency resources in which a UE (or another wireless communication device) has an opportunity to transmit a signal. "Transmission occasion" and "transmission opportunity" may be used interchangeably herein. The UE 120 may perform a channel access procedure (e.g., shown in FIG. 5 as an LBT procedure as an example) prior to transmitting the sidelink communication. As shown in FIG. 5, the channel access procedure may be unsuccessful (e.g., the shared or unlicensed frequency band may be busy). As a result, the UE 120 may refrain from transmitting the sidelink communication using the first transmission occasion 505.

As shown in FIG. 5, the UE 120 may be associated with a second transmission occasion 510 or a third transmission occasion 515. For example, in some cases, based at least in part on being unable to transmit the sidelink communication using the first transmission occasion 505 (e.g., due to the failed channel access procedure), the UE 120 may transmit, to a network node 110, a request for additional time-frequency resources to be used to transmit a retransmission of the sidelink communication. The network node 110 may transmit an indication of the second transmission occasion 510 or the third transmission occasion 515 to the UE 120 (e.g., directly or via one or more network nodes). This may consume additional radio resources and signaling overhead associated with the UE 120 transmitting a request for the additional resources and the network node 110 transmitting a grant indicating the additional resources.

As indicated above, FIG. 5 is provided as an example. Other examples may differ from what is described with respect to FIG. 5.

Figure 6:
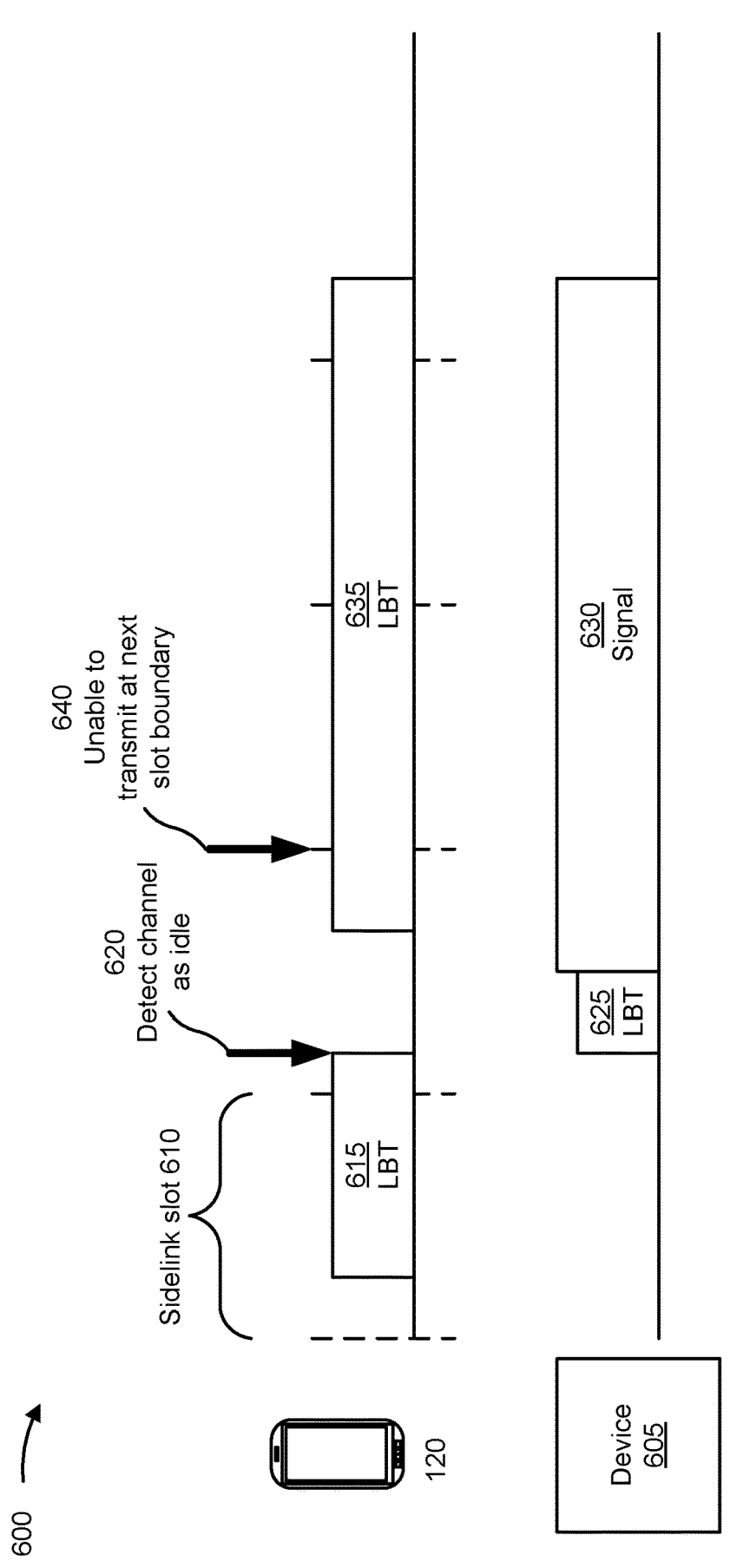
FIG. 6 is a diagram illustrating an example of channel access in a shared or unlicensed frequency band in accordance with the present disclosure.

FIG. 6 is a diagram illustrating an example of channel access 600 in a shared or unlicensed frequency band in accordance with the present disclosure. As shown in FIG. 6, a UE 120 may communicate in a shared or unlicensed frequency band. For example, the UE 120 may communicate one or more sidelink signals in the shared or unlicensed frequency band. As shown in FIG. 6, the UE 120 may be configured with one or more sidelink slots 610. For example, the UE 120 may use slot-based scheduling to transmit or receive the one or more sidelink signals. In other words, UE 120 may only transmit signals starting at slot boundaries. As used herein, "slot boundary" may refer to a first symbol (e.g., a first OFDM symbol) in a slot (e.g., an earliest symbol in time in a slot).

One or more other devices, such as a device 605, may operate in the shared or unlicensed frequency band. The device 605 may be associated with a different RAT (e.g., different than a RAT used by the UE 120), a different slot format, a different transmission timing, or a different scheduling technique, among other examples (e.g., as compared to the UE 120). For example, the device 605 may be associated with an asynchronous transmission timing (e.g., the device may not have to wait for scheduling to transmit signals).

In a first operation 615, the UE 120 may perform a channel access procedure, such as an LBT procedure (e.g., in a similar manner as described in more detail elsewhere herein, such as in connection with FIG. 5). In a second operation 620, the UE 120 may detect that the channel (e.g., the shared or unlicensed frequency band) is idle (e.g., based at least in part on the channel access procedure being successful). However, a timing of the UE 120 detecting that the channel is idle may occur in a middle for a sidelink slot 610. In other words, a timing of the UE 120 detecting that the channel (e.g., the shared or unlicensed frequency band) is idle may be arbitrary (e.g., may occur at any time). However, the UE 120 may need to wait until a next sidelink slot 610 (e.g., until a next slot boundary) to transmit a sidelink communication. For example, because sidelink communications are synchronous, the timing of a transmission of the sidelink communication may be defined as a start of sidelink slot 610. Therefore, the UE 120 may wait (e.g., after detecting that the channel is idle) until a next slot to transmit a sidelink communication.

However, in a time between when the UE 120 detects that the channel is idle and a start of a next slot, the device 605 may sense the channel (e.g., as idle) and begin a transmission of a signal. For example, in a third operation 625, the device 605 may perform a channel access procedure. The device 605 may detect that the channel (e.g., the shared or unlicensed frequency band) is idle (e.g., because the UE 120 is waiting until the next slot to transmit a sidelink signal). Therefore, in a fourth operation 630, the device 605 may transmit a signal. Because the device 605 may be an asynchronous device or may be associated with a different slot format or different slot timing than the UE 120, the device 605 may begin a transmission of the signal (e.g., in the fourth operation 630) prior to a start of the next sidelink slot 610.

In a fifth operation 635, the UE 120 may perform a channel access procedure (e.g., an LBT procedure) shortly before (e.g., one or more OFDM symbols before) the start of the next sidelink slot 610 to ensure that the channel is still idle. However, because the device 605 may have begun transmitting a signal on the channel (e.g., in the fourth operation 630), the UE 120 (e.g., in the fifth operation 635) may detect that the channel is busy. As a result, in a sixth operation 640, the UE 120 may refrain from transmitting a sidelink signal at the next slot boundary. In other words, the UE 120 may be unable to transmit at a next slot boundary due to the signal transmitted by the device 605. Because the UE 120 delays a transmission of a sidelink signal until the next sidelink slot 610 after detecting that the channel is idle (e.g., in the second operation 620), the UE 120 may lose a transmission opportunity. This may increase latency associated with sidelink signals transmitted in the shared or unlicensed frequency band.

This problem may be prevalent in sidelink configurations associated with low subcarrier spacing (SCS), such as 15 kHz or 30 kHz, among other examples (e.g., because a slot duration may be longer with a lower SCS). For example, a slot duration for an SCS of 15 kHz may be approximately 72 microseconds and a slot duration for an SCS of 30 kHz may be approximately 36 microseconds. In some examples, a channel access procedure (such as an LBT procedure) may be completed in as fast as 16 microseconds. Therefore, in the low SCS scenarios, another device (such as the device 605) may complete a channel access procedure while the UE 120 is waiting for a next sidelink slot 610.

As indicated above, FIG. 6 is provided as an example. Other examples may differ from what is described with respect to FIG. 6.

Figure 7:
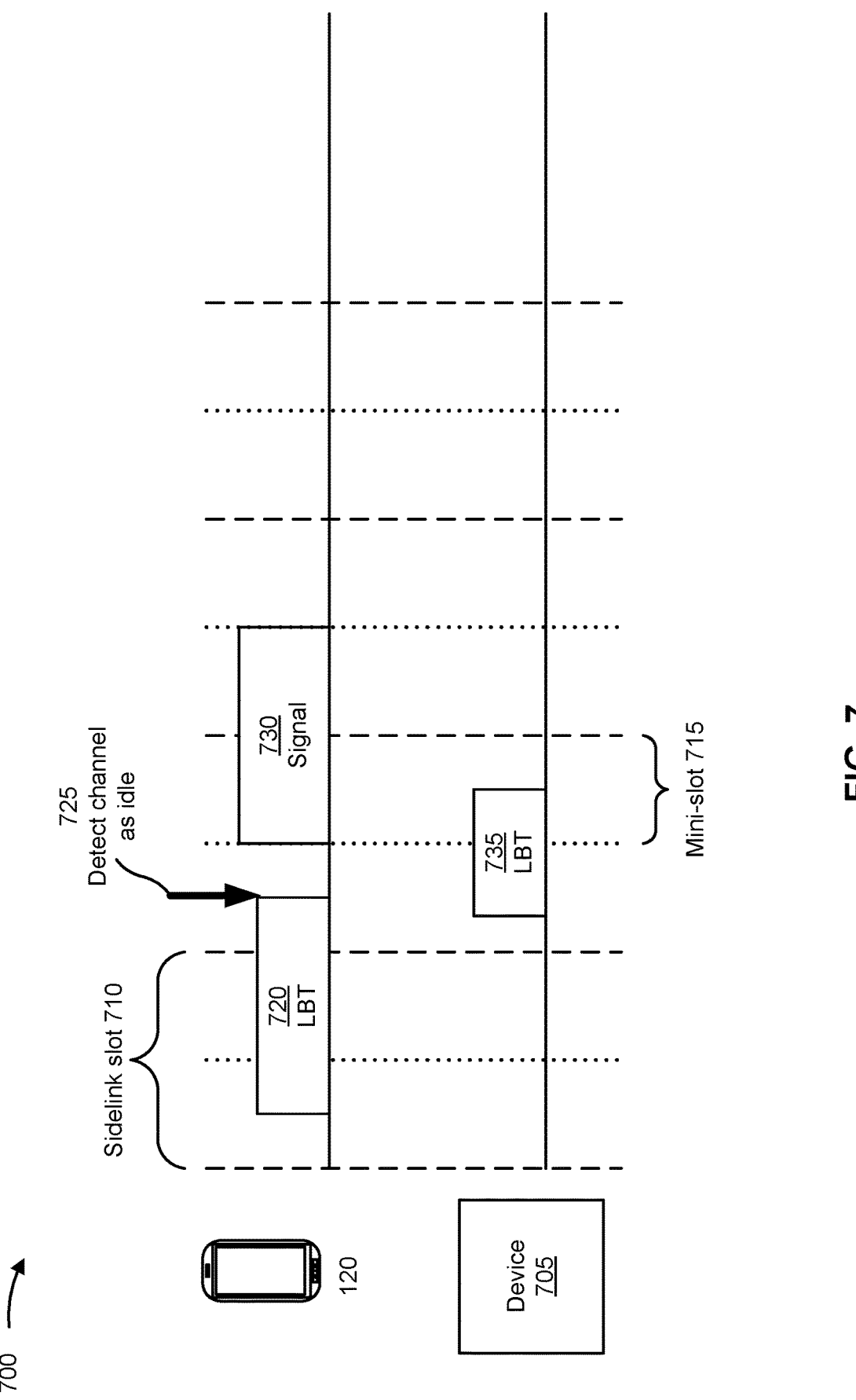
FIG. 7 is a diagram of an example associated with mini-slot channel access for sidelink communications, in accordance with the present disclosure.

FIG. 7 is a diagram of an example 700 associated with mini-slot channel access for sidelink communications, in accordance with the present disclosure. As shown in FIG. 7, a UE 120 may operate in a shared or unlicensed frequency band. For example, the UE 120 may communicate one or more sidelink signals in a shared or unlicensed frequency band, in a similar manner as described elsewhere herein. As shown in FIG. 7, the UE 120 may be configured with one or more sidelink slots 710 and one or more mini-slots 715. For example, the UE 120 may use mini-slot-based scheduling to transmit or receive the one or more sidelink signals. In other words, the UE 120 may transmit signals starting at a start of a sidelink slot 710 or at a start of a mini-slot 715.

In some examples, a sidelink slot 710 may be associated with a first resource pool and a sidelink mini-slot 715 may be associated with a second resource pool. The full slot resource pool and the mini-slot resource pool may be associated with at least partially overlapping time domain resources. The full slot resource pool may support transmissions starting at a first (e.g., earliest) symbol in the sidelink slot 710, where the mini-slot resource pool may support transmissions starting sometime after the first (e.g., earliest) symbol in the sidelink slot 710. The UE 120 may select either the full slot resource pool or the mini-slot resource pool based on a time at which the UE 120 detects that the channel is free or available. As another example, a single resource pool may be configured with multiple possible (e.g., multiple candidate) time domain starting locations for sidelink transmissions. For example, a first possible time domain starting location may be a first (e.g., earliest) symbol in the sidelink slot 710. A second possible time domain starting location may be a first (e.g., earliest) symbol in the mini-slot 715. The UE 120 may select a time domain starting location, from the multiple possible (e.g., multiple candidate) time domain starting locations based on a time at which the UE 120 detects that the channel is free or available.

One or more other devices, such as a device 705, may operate in the shared or unlicensed frequency band. The device 705 may be associated with a different RAT (e.g., different than a RAT used by the UE 120), a different slot format, a different transmission timing, or a different scheduling technique, among other examples (e.g., as compared to the UE 120). For example, the device 705 may be associated with an asynchronous transmission timing (e.g., the device may not have to wait for scheduling to transmit signals).

In a first operation 720, the UE 120 may perform a channel access procedure, such as an LBT procedure (e.g., in a similar manner as described in more detail elsewhere herein). In a second operation 725, the UE 120 may detect that the channel (e.g., the shared or unlicensed frequency band) is idle (e.g., based at least in part on the channel access procedure being successful). However, a timing of the UE 120 detecting that the channel is idle may occur in a middle of a sidelink slot 710. In other words, a timing of the UE 120 detecting that the channel (e.g., the shared or unlicensed frequency band) is idle may be arbitrary (e.g., may occur at any time). However, in a third operation 730, the UE 120 may transmit a sidelink signal starting at a start of a mini-slot 715. For example, as shown in FIG. 7, the UE 120 may not be required to wait until a start of a next slot (e.g., after detecting that the channel is idle in the second operation 725) to transmit the sidelink signal in the third operation 730. In some examples, for a first slot of a COT, a sidelink communication may be associated with a single TB. A size of the TB may be selected (e.g., by a UE 120 or by a network node 110) based on resources included in mini-slots 715. This may reduce a complexity associated with monitoring sidelink slots 710 and mini-slots 715 (e.g., a UE 120 may not be required to have two different hypotheses for two different TB sizes, such as a first hypothesis for a first TB size associated with a sidelink slot 710 and a second hypothesis for a second TB size associated with a mini-slot 715). The PSCCH and the PSSCH may be mapped (e.g., to resources) and rate matched to a sidelink slot 710 or a mini-slot 715 based on a timing at which the UE 120 detects that the channel is free and/or available.

This may reduce a likelihood that the device 705 is able to sense the channel (e.g., the shared or unlicensed frequency band) and initiate a transmission before the next transmission opportunity for the UE 120. For example, in a fourth operation 735, the device 705 may perform a channel access procedure. However, because of the transmission of the sidelink signal by the UE 120 in the third operation 730, the device 705 may detect that the channel is busy and may refrain from transmitting on the channel. Therefore, the UE 120 using mini-slot-based scheduling may improve a likelihood that the UE 120 is able to transmit the sidelink signal or may reduce a latency associated with the sidelink signal.

As indicated above, FIG. 7 is provided as an example. Other examples may differ from what is described with respect to FIG. 7.

Figure 8:
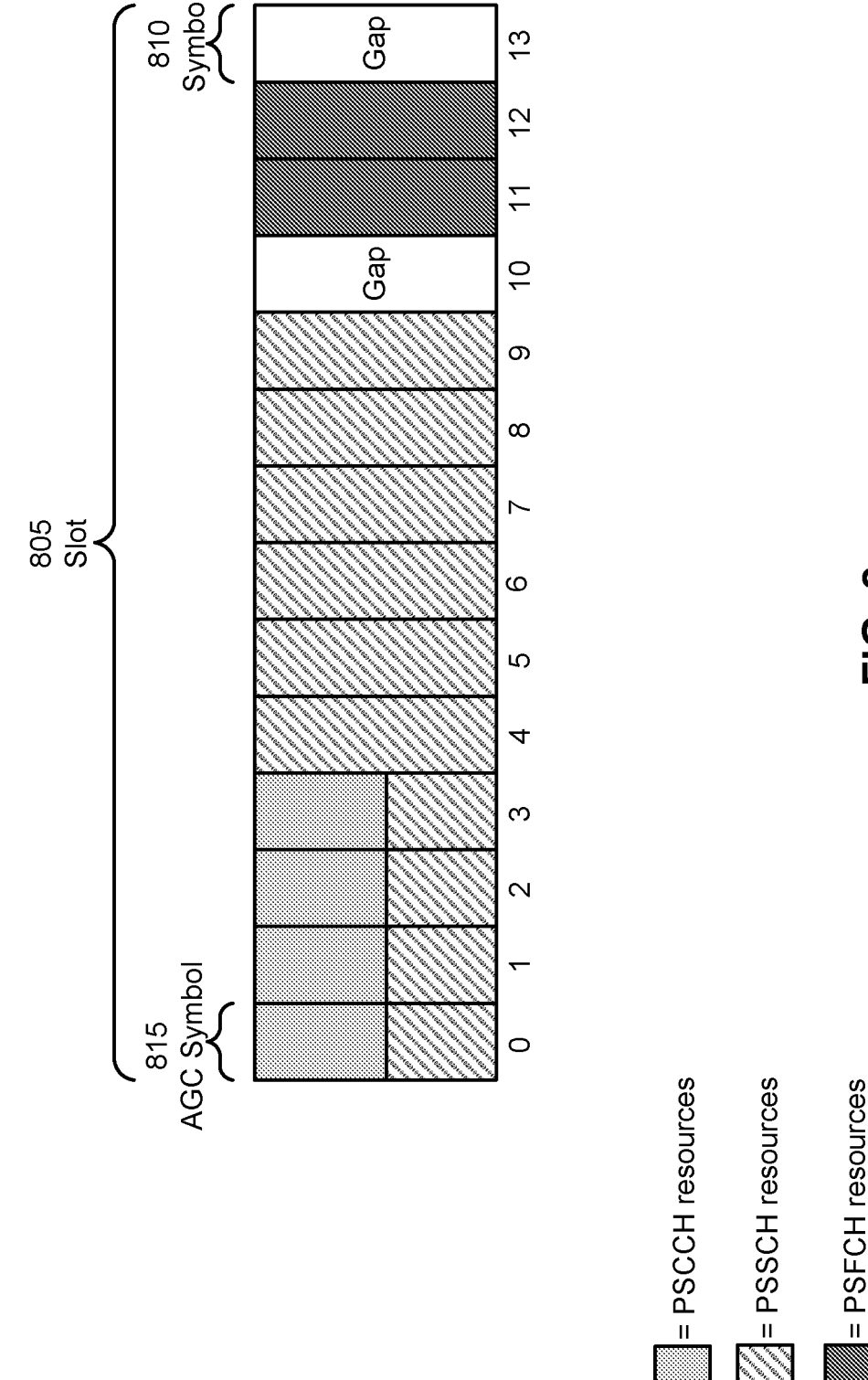
FIG. 8 is a diagram illustrating an example of a sidelink slot format that includes physical sidelink feedback channel (PSFCH) resources, in accordance with the present disclosure.

FIG. 8 is a diagram illustrating an example of a sidelink slot format 800 that includes PSFCH resources, in accordance with the present disclosure. As shown in FIG. 8, a slot 805 (e.g., a sidelink slot) may include multiple symbols 810 (e.g., 14 symbols 810 as shown in FIG. 8). The slot 805 may include a set of time-frequency resources (such as resource elements (REs)) that are associated with, or reserved for, transmissions via the PSCCH. Additionally, the slot 805 may include a set of time-frequency resources (such as REs) that are associated with, or reserved for, transmissions via the PSSCH. Further, the slot 805 may include a set of time-frequency resources (such as REs) that are associated with, or reserved for, transmissions via the PSFCH.

In other words, a PSCCH, a PSSCH, and a PSFCH may be transmitted within a same slot (e.g., the slot 805). The PSCCH may occupy up to one subchannel with a lowest subchannel index. SCI-1 may be transmitted in the PSCCH and may indicate information regarding a PSSCH bandwidth and resource reservations in upcoming slots. The PSCCH may be configured (or preconfigured) to occupy 10, 12, 15, 20, or 25 physical resource blocks (PRBs), and may be limited to one subchannel, where each sub-channel may occupy 10, 15, 20, 25, 50, 75, or 100 PRBs. A PSCCH duration may be configured (or preconfigured) to two or three symbols. A PSCCH size may be fixed for a resource pool. The PSSCH may occupy up to $$N^{SL}_{subchannel}$$

channel contiguous subchannels. SCI-2 may be decoded after decoding the PSCCH. In other words, the PSSCH may occupy at least one subchannel and may contain the SCI-2.

As shown in FIG. 8, at least one symbol 810 in the slot 805 may be an automatic gain control (AGC) symbol 815. For example, to compensate for a power variability of sidelink signals, a UE may perform an AGC operation on a signal in a first one or more symbols 810 of each slot 805 in order to adjust the power of the signal to a suitable amplitude. Accordingly, when performing a demodulation operation on the signal, the UE may drop the AGC symbol 815 if an AGC operation was performed on the signal in the AGC symbol 815.

In some examples, a UE may transmit or receive HARQ feedback via the PSFCH (such as the PSFCH 325). The PSFCH may be configured, or enabled, for unicast transmissions (e.g., for one-to-one communications) or for groupcast transmissions (e.g., for one-to-many communications). A PSFCH transmission may include one bit indicating ACK feedback or NACK feedback. For groupcast transmissions, in some cases, a PSFCH transmission may be associated with NACK feedback (e.g., a UE may transmit the PSFCH transmission to indicate NACK feedback and may not transmit the PSFCH transmission to indicate ACK feedback). Alternatively, for groupcast transmissions, a PSFCH transmission may be associated with ACK feedback and NACK feedback. A PSFCH transmission may indicate HARQ feedback (e.g., ACK/NACK feedback) for a transmission that is received K slots prior to the transmission of the PSFCH transmission (e.g., K slots prior to the slot 805). A value for K may be configured for a UE and may be 2, 3, or another quantity of slots.

A PSFCH transmission may use a format. The format may be based at least in part on (or may be the same as) a PUCCH format (e.g., as defined, or otherwise fixed, by a wireless communication standard, such as the 3GPP). For example, a PSFCH transmission may use a PUCCH format 0 (e.g., as defined, or otherwise fixed, by a wireless communication standard, such as the 3GPP). In some cases, only a single format (e.g., the PUCCH format 0) may be defined for the PSFCH.

A UE may receive (such as from a network node 110 or another control entity) a PSFCH configuration. The PSFCH configuration may be associated with, or included in, a sidelink resource pool configuration. The PSFCH configuration may indicate a periodicity associated with the PSFCH. The periodicity may indicate how often, in terms of a quantity of slots, resources are to be reserved for the PSFCH. For example, the periodicity may be associated with values of 0 (e.g., indicating that the PSFCH is disabled or not configured), 1 (e.g., indicating that each slot includes resources reserved for the PSFCH), 2 (e.g., indicating that every other slot includes resources reserved for the PSFCH), 4 (e.g., indicating that every $4^{th}$ slot includes resources reserved for the PSFCH), or another value. The PSFCH configuration may indicate a time gap (e.g., a minimum time gap) between the resources reserved for the PSFCH and an associated PSSCH reception (e.g., the resources reserved for the PSFCH may be used by the UE to transmit ACK/NACK feedback for the associated PSSCH reception). The time gap may be defined in terms of a quantity of slots, such as 2 slots, 3 slots, or another quantity of slots.

The PSFCH configuration may indicate a quantity of multiplexing cyclic shifts. For example, because the PSFCH may re-use the PUCCH format 0, the PSFCH may be associated with 2 base sequences with one or more allowed cyclic shifts (e.g., to mitigate a risk of a collision or interference with a PSFCH transmission from another UE using the same time-frequency resources). The PSFCH configuration may indicate resources reserved for the PSFCH. For example, a configuration parameter (such as an rbSetPSFCH parameter, as defined, or otherwise fixed, by a wireless communication standard) may indicate a set of PRBs that are reserved for the PSFCH (e.g., a set of PRBs, from a resource pool, for PSFCH transmission).

For example, the PSFCH may be mapped to one RB. The configuration parameter (such as the rbSetPSFCH parameter) may provide the set of PRBs available for the PSFCH in the resource pool. A UE may identify candidate RBs for the PSFCH for a subchannel, j, and a slot, i. The UE may allocate the $[(i+j \cdot N_{PSFCH}) \cdot M_{Subc,slot}]$ to $[(i+1 \cdot jN_{PSFCH}) \cdot M_{Subc,slot} - 1]$ RBs for the PSFCH. $N_{PSFCH}$ may be a quantity of slots associated with the PSFCH (e.g., indicated by the periodicity associated with the PSFCH). $M_{Subc,slot}$ may be a quantity of the RBs, defined by $$M_{Subc,slot} = \frac{\begin{array}{c}\text{\# of RBS allocated for the } \textit{PSFCH} \\ \text{(by the } \textit{rbSetPSFCH} \text{ parameter)}\end{array}}{\begin{array}{c}\text{(value for the periodicity of the } \textit{PSFCH} \cdot \\ \text{a quantity of subchannels associaced with the } \textit{PSFCH})\end{array}}.$$

For example, if $N_{PSFCH}$ is 2 and $M_{Subc,slot}$ is 5, and j is 0, then RBs [0 to 4] for i=0 and RBs [5 to 9] for i=1 may be reserved for the PSFCH by the UE. The UE may determine resources for multiplexing the PSFCH as $R=N_{type} \cdot M_{Subc,slot} \cdot \#CS$, where $N_{type}$ is a value configured for the PSFCH associated with a starting subchannel of the PSFCH, and where #CS is the configured quantity of the cyclic shift for the PSFCH. The UE may select an RB, from the RBs reserved for the PSFCH in accordance with $(P_{ID}+M_{ID})$ modR, where $P_{ID}$ is an identifier of the transmitter (e.g., of the UE), and where $M_{ID}$ is a receiver identifier for groupcast transmissions (if not a groupcast, $M_{ID}=0$).

A PSFCH transmission may be duplicated in a preceding symbol. For example, as shown in FIG. 8, two symbols 810 may be allocated for the PSFCH. The second symbol 810 may include the RB selected by the UE for the PSFCH transmission and the first symbol 810 may include a duplicated (e.g., identical) version of the PSFCH transmission. For example, the first symbol may be used for AGC operations by a receiver. In other words, the PSFCH transmission may be associated with a single RB in a single symbol, where the information carried in the single symbol is duplicated across 2 symbols.

The PSFCH transmission may be based at least in part on a Zadoff-Chu sequence. The Zadoff-Chu sequence may be generated based at least in part on a group and a sequence number. The group may be indicated by a configuration parameter that is associated with a PSFCH hopping (e.g., frequency hopping) configuration, such as an sl-PSFCH-HopID-r16 parameter. In some examples, the PSFCH may be associated with cyclic shift hopping or frequency hopping. For example, the PSFCH may apply cyclic shift hopping in accordance with the equation $$\frac{2\pi}{12}((m_0 + m_{CS} + n_{CS}(n_{s,f}^{\mu}, l + l'))\bmod 12),$$

where $m_0$ is based at least in part on a PSFCH configuration of supported cyclic shift pairs, $m_{CS}$ is based at least in part on a value of ACK/NACK and a HARQ mode associated with the PSFCH transmission, and $$n_{CS}(n_{s,f}^{\mu}, l + l')$$

is a function that is based at least in part on a slot number and a symbol index of the PSFCH.

A UE may determine a transmit power for a PSFCH transmission using open-loop power control or closed-loop power control. For example, the UE may determine a transmit power for a PSFCH transmission based at least in part on a nominal transmit power level (e.g., that is configured for the PSFCH or for a resource pool associated with the PSFCH), a scaling factor that is based at least in part on the subcarrier spacing that is configured for the resource pool associated with the PSFCH, or a downlink pathloss value, among other examples. For example, the UE may determine a transmit power for a PSFCH transmission using the equation $P_{O,PSFCH}+10 \log_{10}(2^{\mu})+\alpha_{PSFCH} \cdot PL$, where $P_{O,PSFCH}$ is the nominal transmit power level, $10 \log_{10}(2^{\mu})$ is the scaling factor that is based at least in part on the subcarrier spacing ($\mu$), and $\alpha_{PSFCH}+PL$ is a compensation value for the downlink pathloss (e.g., where $\alpha_{PSFCH}$ is a pathloss offset (e.g., a fractional pathloss parameter) open-loop power control parameter (alpha or $\alpha$) configured for the PSFCH and PL is the downlink pathloss measured via a reference signal). For example, the transmit power for a PSFCH transmission may compensate for downlink pathloss to mitigate a risk of interference caused by the PSFCH transmission to a Uu interface or an access link with a network node 110. In some examples, where the UE is transmitting multiple PSFCH transmissions simultaneously, a maximum transmit power of the UE may be split (e.g., equally) among all of the multiple PSFCH transmissions.

In some cases, the UE may be permitted to start a sidelink transmission in a middle of the slot 805 (e.g., at a start of a mini-slot in a similar manner as described above in connection with FIG. 7). For example, the UE may start a sidelink transmission at a symbol 7 shown in FIG. 8. However, a slot format may indicate that the slot 805 includes PSFCH resources or a PSFCH instance (e.g., in symbols 11 and 12 as shown in FIG. 8). In such examples, the format of the mini-slot (e.g., starting a symbol 7 of the slot 805) may not be defined or configured (e.g., when the slot 805 is configured with PSFCH resources). For example, the PSFCH configuration may be determined (e.g., by a network node 110) assuming that the UE uses slot-based scheduling. If the UE initiates a transmission in the middle of the slot 805 (e.g., at symbol 7 or another symbol that is not symbol 0), the UE may not know what the slot format of the mini-slot is (e.g., which symbols are allocated for PSCCH transmissions and/ or PSSCH transmission) and/or how to handle the configured PSFCH resources. Therefore, a data capacity associated with the mini-slot may be reduced (e.g., due to the resources allocated for the PSFCH) and/or a configured PSFCH instance may be missed (e.g., if the UE ignores the PSFCH resources when transmitting using a mini-slot). This may reduce an efficiency and/or a communication performance Some techniques and apparatuses described herein enable a sidelink feedback channel (e.g., a PSFCH) slot format for mini-slot channel access. For example, the UE may receive an indication of a sidelink slot format. The sidelink slot format may indicate a configuration of sidelink feedback resources (e.g., PSFCH resources). The sidelink slot format may indicate that sidelink slots are associated with transmission starting locations that include first symbols of sidelink slots and one or more other symbols of sidelink slots (e.g., may indicate that mini-slot scheduling is enabled). The UE may measure a signal associated with a channel access procedure, where the measurement of the signal indicates that the UE is permitted to access a sidelink channel. The measurement of the signal may occur after a first symbol (e.g., a symbol 0) of a first sidelink slot and prior to a second symbol (e.g., a starting symbol of a mini-slot) of the first sidelink slot that is associated with a transmission starting location as indicated by the sidelink slot format. The sidelink slot format may indicate that the first sidelink slot is associated with the sidelink feedback resources. In other words, based on performing a channel access procedure (e.g., an LBT procedure), the UE may determine that a sidelink transmission is to occur in a mini-slot that is included in a slot that is configured with PSFCH resources. The UE may transmit using a transmission starting location of the second symbol of the first sidelink slot or of a symbol of a second sidelink slot, a sidelink communication based at least in part on the measurement of the signal. In some aspects, a format of the sidelink feedback resources may be based at least in part on the transmission starting location.

For example, the mini-slot may include sidelink feedback resources (e.g., the PSFCH resources) if the mini-slot and the PSFCH resources are included in the same slot. As another example, the symbol(s) that are configured to be associated with the sidelink feedback resources may be used by the UE to transmit sidelink data. In other words, the UE may allocate the symbol(s) that are configured to be associated with the sidelink feedback resources for a sidelink data channel (e.g., the UE may override the PSFCH resources with PSSCH resources) for the mini-slot. As another example, the UE may refrain from transmitting in the mini-slot if the slot in which the mini-slot occurs is configured with PSFCH resources. For example, the UE may transmit the sidelink communication starting at the symbol (e.g., a symbol 0 or a first symbol) of the second sidelink slot. In other words, the UE may refrain from using mini-slot scheduling in slots that are configured with side-link feedback resources (e.g., PSFCH resources).

As a result, the UE may identify a slot format for mini-slots that occur in slots that are configured with side-link feedback resources (e.g., PSFCH resources). For example, the UE may be enabled to identify resource allocations for symbols of the mini-slot. Defining the mini-slot structure when the mini-slot includes sidelink feedback resources may ensure that UEs in a sidelink network are synchronized for sidelink feedback resource configurations when mini-slot scheduling is enabled. Ensuring that the UEs are synchronized as to the mini-slot formats may improve communication performance and/or reduce a likelihood that a UE misses a sidelink feedback transmission and/or a sidelink data transmission.

As indicated above, FIG. 8 is provided as an example. Other examples may differ from what is described with respect to FIG. 8.

Figure 9A:
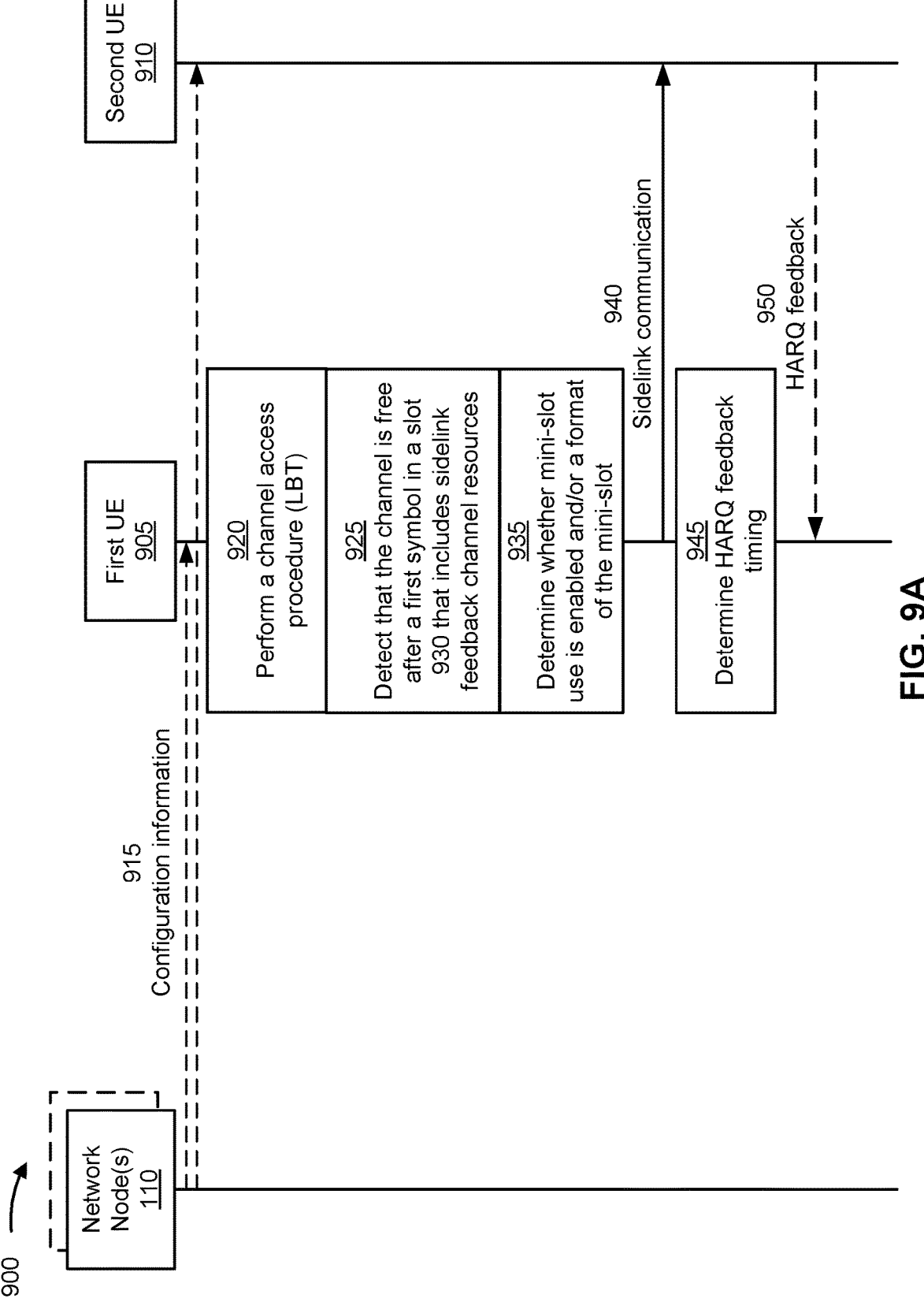

FIGS. 9A-9D are diagrams of an example 900 associated with a sidelink feedback channel slot format for mini-slot channel access, in accordance with the present disclosure. As shown in FIG. 9A, one or more network nodes 110 (e.g., a CU, a DU, an RU, or a base station) may communicate with a first UE 905 (e.g., a first UE 120) and a second UE 910 (e.g., a second UE 120). In some aspects, the network node(s) 110, the first UE 905, and the second UE 910 may be part of a wireless network (e.g., the wireless network 100). The first UE 905 and the network node 110 may have established a wireless connection prior to operations shown in FIGS. 9A-9D. Similarly, the second UE 910 and the network node 110 may have established a wireless connection prior to operations shown in FIGS. 9A-9D. The first UE 905 and the second UE 910 may communicate with each other using a sidelink (e.g., in a similar manner as described in connection with FIGS. 4 and 5).

The first UE 905 and the second UE 910 may be operating in an unlicensed or shared sidelink channel (e.g., in an unlicensed or shared frequency band). In some aspects, the first UE 905 and the second UE 910 may communicate via an unlicensed or shared sidelink frequency band (e.g., sometimes referred to as a sidelink unlicensed (SL-U) frequency band). For example, the first UE 905 and the second UE 910 may communicate via one or more SL-U procedures (e.g., as defined, or otherwise fixed, by a wireless communication standard, such as the 3GPP).

As used herein, the network node 110 "transmitting" a communication to a UE 120 (e.g., the first UE 905 or the second UE 910) may refer to a direct transmission (e.g., from the network node 110 to the UE 120) or an indirect transmission via one or more other network nodes or devices. For example, if the network node 110 is a DU, an indirect transmission to the UE 120 may include the DU transmitting a communication to an RU and the RU transmitting the communication to the UE 120. Similarly, a UE 120 (e.g., the first UE 905 or the second UE 910) "transmitting" a communication to the network node 110 may refer to a direct transmission (e.g., from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU. References herein to "a network node 110" or "the network node 110" can, in some aspects, refer to multiple network nodes.

In some aspects, as shown by reference number 915, the network node 110 may transmit, and the first UE 905 and/or the second UE 910 may receive, configuration information. In some aspects, the first UE 905 or the second UE 910 may receive the configuration information via one or more of RRC signaling, one or more medium access control (MAC) control elements (MAC-CEs), or DCI, among other examples. In some other aspects, the first UE 905 and/or the second UE 910 may receive the configuration from another UE (e.g., via sidelink control signaling, sidelink RRC signaling, or another type of signaling), from a roadside unit (RSU), or from another network entity. In some aspects, the configuration information may include an indication of one or more configuration parameters for selection by the first UE 905 and/or the second UE 910, or explicit configuration information for the first UE 905 and/or the second UE 910 to use to configure itself, among other examples. In some aspects, the first UE 905 and/or the second UE 910 may receive the configuration information via a Uu interface or an access link. In other aspects, the first UE 905 and/or the second UE 910 may receive the configuration information via a PC5 interface.

In some aspects, the configuration information may be associated with a sidelink configuration. For example, the first UE 905 and/or the second UE 910 may be configured to perform one or more operations described herein associated with a sidelink or PC5 interface. In some aspects, the configuration information may be, or may be associated with, an SL-U configuration. For example, the first UE 905 or the second UE 910 may be configured to perform one or more operations described herein via a shared or unlicensed frequency band. For example, the configuration information may indicate one or more shared or unlicensed frequency bands to be used by the first UE 905 or the second UE 910 for sidelink communications. Additionally, or alternatively, the configuration information may indicate one or more resource pool configurations to be used by the first UE 905 and/or the second UE 910 for sidelink communications.

As used herein, a "starting time domain location" and/or "transmission starting location" may refer to a time at which a communication is first transmitted (e.g., a first (or earliest) OFDM symbol in time associated with the communication). As described elsewhere herein, a "plurality of available starting time domain locations" may refer to multiple, or additional, opportunities for a UE (e.g., the first UE 905 and/or the second UE 910) to initiate a sidelink communication (e.g., in addition to configured slot boundaries). The multiple available starting time domain locations may be associated with mini-slot-based scheduling. For example, the multiple available starting time domain locations may include one or more starting time domain locations that are not aligned with slot boundaries. As an example, the multiple available starting time domain locations may be associated with mini-slots. For example, the multiple available starting time domain locations may include a start of slots (e.g., configured sidelink slots) and a start of mini-slots. In other words, the multiple available starting time domain locations may be associated with one or more mini-slots.

In some aspects, the configuration information may include a PSFCH configuration. The PSFCH configuration may be associated with, or included in, a sidelink resource pool configuration. The PSFCH configuration may indicate a periodicity associated with the PSFCH. The periodicity may indicate how often, in terms of a number of slots, resources are to be reserved for the PSFCH. For example, the periodicity may be associated with values of 0 (e.g., indicating that the PSFCH is disabled or not configured), 1 (e.g., indicating that each slot includes resources reserved for the PSFCH), 2 (e.g., indicating that every other slot includes resources reserved for the PSFCH), 4 (e.g., indicating that every $4^{th}$ slot includes resources reserved for the PSFCH), or another value. The PSFCH configuration may indicate a time gap (e.g., a minimum time gap) between the resources reserved for the PSFCH and an associated PSSCH reception (e.g., the resources reserved for the PSFCH may be used by the UE to transmit ACK/NACK feedback for the associated PSSCH reception). The time gap may be defined in terms of a number of slots, such as 2 slots, 3 slots, or another number of slots.

The PSFCH configuration may indicate a number of multiplexing cyclic shifts. For example, because the PSFCH may re-use the PUCCH format 0, the PSFCH may be associated with 2 base sequences with one or more allowed cyclic shifts (e.g., to mitigate a risk of a collision or interference with a PSFCH transmission from another UE using the same time-frequency resources). The PSFCH configuration may indicate resources reserved for the PSFCH. For example, a configuration parameter (such as an rbSetPSFCH parameter, as defined, or otherwise fixed, by a wireless communication standard) may indicate a set of PRBs that are reserved for the PSFCH (e.g., a set of PRBs, from a resource pool, for PSFCH transmission).

For example, the first UE 905 and/or the second UE 910 may receive an indication of a sidelink slot format (e.g., via the configuration information, such as in one or more resource pool configurations). The indication of the sidelink slot format may indicate, or be associated with, a configuration of sidelink feedback resources (e.g., the PSFCH configuration). Additionally, the sidelink slot format and/or the configuration information may indicate that that sidelink slots are associated with transmission starting locations that include first symbols of sidelink slots (e.g., an earliest symbol in the time domain and/or a symbol 0) and one or more other symbols of sidelink slots (e.g., symbols that occur after the earliest symbol in the time domain, such as the $4^{th}$ symbol, the $7^{th}$ symbol, and/or the $10^{th}$ symbol). In other words, the sidelink slot format and/or the configuration information may indicate that mini-slot scheduling is enabled and may indicate a configuration of PSFCH resources for sidelink slots.

In some aspects, the first UE 905 may transmit, and the network node 110 may receive, a capability report. The capability report may indicate that the first UE 905 supports sidelink communication in a shared or unlicensed channel or frequency band. Additionally, the capability report may indicate that the first UE 905 supports using multiple starting locations or mini-slot-based scheduling. The network node 110 may configure the first UE 905 to use the shared or unlicensed channel or frequency band or to use multiple starting locations or mini-slot-based scheduling based at least in part on receiving the capability report. The second UE 910 may transmit, and the network node 110 may receive, a capability report in a similar manner as described above.

In some aspects, starting locations (e.g., starting symbols) within a slot may be configured and/or negotiated between the first UE 905 and the second UE 910 (e.g., via sidelink or PC5 RRC signaling). For example, which symbols of a slot are to be available as starting time domain locations for sidelink communications may be configured on a per-link basis (e.g., between the first UE 905 and the second UE 910).

The first UE 905 may configure itself based at least in part on the configuration information. In some aspects, the second UE 910 may configure itself based at least in part on the configuration information. In some aspects, the first UE 905 or the second UE 910 may be configured to perform one or more operations described herein based at least in part on the configuration information.

As shown by reference number 920, the first UE 905 may perform a channel access procedure, such as an LBT procedure. For example, the first UE 905 may perform one or more measurements associated with a channel access procedure for accessing the shared or unlicensed sidelink channel (e.g., the shared or unlicensed frequency band). For example, the channel access procedure may be an LBT procedure. For example, the first UE 905 may detect or determine that the first UE 905 has sidelink data to be transmitted. Therefore, the first UE 905 may attempt to access the shared or unlicensed sidelink channel (e.g., the shared or unlicensed frequency band) to transmit the sidelink data by performing the channel access procedure.

For example, the first UE 905 may measure a signal associated with a channel access procedure. In some aspects, the measurement of the signal may indicate that the first UE 905 is permitted to access a sidelink channel. For example, the measurement may satisfy an energy detection threshold associated with the channel access procedure. For example, if the measurement satisfies the energy detection threshold, then the first UE 905 may determine that the shared or unlicensed sidelink channel (for example, the shared or unlicensed frequency band) is idle or available. If the measurement does not satisfy the energy detection threshold, then the first UE 905 may determine that the shared or unlicensed sidelink channel (for example, the shared or unlicensed frequency band) is busy (for example, the channel access procedure may be associated with a failure) and the first UE 905 may refrain from transmitting using the shared or unlicensed sidelink channel.

For example, as shown by reference number 925, the first UE 905 may determine or detect that the measurement of the signal (e.g., of the shared or unlicensed sidelink channel) satisfies the energy detection threshold at a time that is after a first symbol of a slot 930 (e.g., a symbol 0 or a first symbol in the time domain) but is before a first symbol of a mini-slot included in the slot 930. The slot 930 may be associated with sidelink feedback resources. For example, one or more symbols of the slot 930 may be configured to be associated with PSFCH resources (e.g., as indicated by the PSFCH configuration). For example, the measurement of the signal may occur after the first symbol of the slot 930 and prior to a second symbol of the slot 930 that is associated with a transmission starting location (e.g., a first symbol of a mini-slot included in the slot 930) as indicated by the sidelink slot format. As an example, the measurement and/or the determination that the measurement satisfies the energy detection threshold may occur after a symbol 0 of the slot 930, but prior to a symbol 7 of the slot 930 (e.g., where the symbol 7 is a last possible starting time domain location or transmission starting location in the slot), as depicted in FIGS. 9B and 9C. Therefore, the first UE 905 may determine that a mini-slot is to be used for the transmission of the sidelink data.

As shown by reference number 935, the first UE 905 may determine whether mini-slot use is enabled for the slot 930 (e.g., due to the slot 930 including PSFCH resources and/or a PSFCH instance). For example, in some aspects, mini-slot use may be disabled or not allowed when a slot (e.g., the slot 930) includes PSFCH resources (e.g., as depicted and described in more detail in connection with FIG. 9D). In some aspects, mini-slot use may be disabled or not allowed when a slot includes PSFCH resources based on a period associated with the PSFCH resources being greater than one slot (e.g., because if the period associated with the PSFCH resources is one slot, then PSFCH resources would be included in each slot and no slots would be available for mini-slot use).

Additionally, or alternatively, the first UE 905 may determine a format of the sidelink feedback resources (e.g., PSFCH resources) in the mini-slot that is included in the slot 930 (e.g., if mini-slot use is enabled for the slot 930). In some aspects, the format of the of the sidelink feedback resources may indicate that the mini-slot includes sidelink feedback resources in a similar, or the same, time domain location as indicated or configured for the slot 930.

For example, as shown in FIG. 9B, the slot 930 may include a mini-slot 960 (e.g., that is to be used by the first UE 905 to transmit sidelink data, as described in more detail elsewhere herein). The mini-slot 960 may include symbols 7 through 13 of the slot 930. As shown in FIG. 9B, a first symbol (e.g., symbol 7) of the mini-slot may be an AGC symbol 965. The format of the sidelink feedback resources may indicate that a first one or more symbols of the first sidelink slot are associated with the sidelink feedback resources (e.g., symbol 13) and a second one or more symbols (e.g., symbol 12) of the first sidelink slot are associated with an AGC operation for a sidelink feedback channel. In other words, the mini-slot 960 may contain PSFCH resources at the end of the mini-slot if a PSFCH instance falls in the slot 930 (e.g., in the slot in which the mini-slot is included). For example, the mini-slot 960 may include an AGC symbol 970 (e.g., for the PSFCH) and one PSFCH symbol (e.g., at symbols 11 and 12 of the slot 930).

In some other examples, the format of the sidelink feedback resources may indicate that the sidelink feedback resources are associated with a sidelink data channel (e.g., the PSSCH) based at least in part on the transmission starting location of the sidelink communication being the second symbol (e.g., the symbol 7 or another symbol that is not the symbol 0) of the slot 930. In other words, as shown in FIG. 9C, if the first UE 905 uses a mini-slot that is included in a slot that includes a PSFCH instance, then the first UE 905 may use resources in the slot that are configured for the PSFCH for the PSSCH. For example, the symbols 11 and 12 of the slot 930 may be configured for the PSFCH (e.g., as indicted by the PSFCH configuration), in a similar manner as depicted in FIG. 9B. However, when transmitting the sidelink communication, the first UE 905 may transmit data associated with the sidelink communication using one or more symbols (e.g., symbols 11 and 12) associated with the sidelink feedback resources as indicated by the sidelink slot format. For example, the first UE 905 may override the PSFCH instance with PSSCH resources if the first UE 905 determines to use the mini-slot 960.

For example, because the first UE 905 may access the shared or unlicensed channel and may start a transmission before the configured PSFCH instance, another UE (e.g., the second UE 910) may be unable to access the shared or unlicensed channel during the PSFCH instance. Therefore, because other UEs that may transmit sidelink feedback data using the PSFCH resources may be unable to access the shared or unlicensed channel during the PSFCH instance, the PSFCH resources may be overridden with PSSCH resources to improve an efficiency and/or improve a data capacity of the mini-slot 960.

Figure 9D:
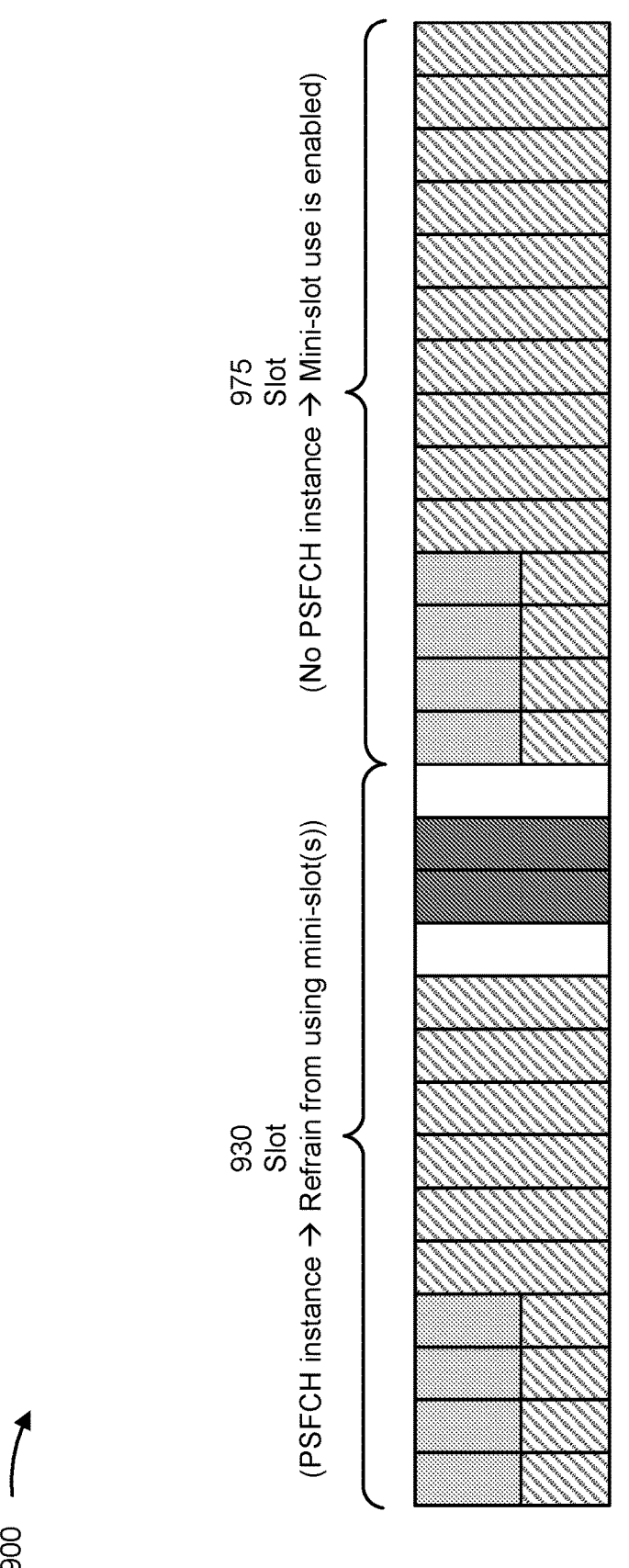

As shown in FIG. 9D, the transmission starting location of a sidelink communication to be transmitted by the first UE 905 may be a symbol of a second slot 975 based at least in part on the slot 930 being associated with the sidelink feedback resources. In other words, the first UE 905 may refrain from using the second symbol (e.g., the symbol 7) of the slot 930 as the transmission starting location based at least in part on the slot 930 being associated with the sidelink feedback resources. For example, mini-slot access may be disabled if a slot (e.g., the slot 930) includes PSFCH instances and/or PSFCH resources. As shown in FIG. 9D, for slots (such as the second slot 975) that do not include PSFCH instances and/or PSFCH resources (e.g., as indicated by the PSFCH configuration), mini-slot access may be enabled. In other words, the first UE 905 may be enabled to use a mini-slot that is included in the second slot 975 for a transmission of a sidelink communication. This may reduce a complexity associated with handling PSFCH instances when mini-slot scheduling is enabled. Additionally, this may ensure that PSFCH communications are not missed by UEs in the sidelink network.

Returning to FIG. 9A, and as shown by reference number 940, the first UE 905 may transmit (and the second UE 910 may receive) a sidelink communication. The first UE 905 may transmit the sidelink communication at a transmission starting location. The sidelink communication may include one or more PSCCH communications and/or one or more PSSCH communications. In some aspects, the sidelink communication may have a duration that is less than a full sidelink slot (e.g., where mini-slot scheduled is used by the first UE 905). In some other aspects, the sidelink communication may have a duration of a full sidelink slot.

In some aspects, the transmission starting location may be a symbol in the slot 930 (e.g., associated with a start of the mini-slot 960). In some other aspects, the transmission starting location may be a symbol in the second slot 975 (e.g., a first symbol (symbol 0) of the second slot 975 or a first symbol of a mini-slot included in the second slot 975). In some aspects, where the first UE 905 uses the mini-slot 960 for the sidelink communication, the mini-slot 960 may include one or more PSFCH resources (e.g., as described and depicted in connection with FIG. 9C). In some aspects, the first UE 905 may transmit data associated with the sidelink communication using one or more symbols associated with the sidelink feedback resources as indicated by the sidelink slot format (e.g., as described and depicted in connection with FIG. 9C).

As shown by reference number 945, the first UE 905 may determine a HARQ timing feedback for the sidelink communication. For example, the sidelink communication (e.g., a PSSCH communication) may be transmitted via the mini-slot 960. The HARQ feedback timing may refer to a number of slots after the mini-slot 960 in which HARQ feedback for the sidelink communication is to be transmitted and/or received. For example, the transmission starting location of the sidelink communication may be the mini-slot 960. A timing associated with hybrid automatic repeat request feedback for the sidelink communication may be based at least in part on the first symbol of the slot 930. In other words, even if a mini-slot is used for a sidelink communication, a timing for HARQ feedback may be measured from a first symbol of the slot in which the mini-slot occurs. Additionally, the HARQ feedback may be mapped to a PSFCH instance or PSFCH resources as if the sidelink communication were a full-slot transmission. This may reduce a complexity associated with determining HARQ feedback timing when mini-slots are used by the first UE 905.

As shown by reference number 950, the first UE 905 may receive, and the second UE 910 may transmit, HARQ feedback associated with the sidelink communication. For example, the first UE 905 may monitor PSFCH resources that occur at a time indicated by the HARQ feedback timing (e.g., as determined by the first UE 905 as described above). The second UE 910 may determine the HARQ feedback timing in a similar manner. By determining the HARQ feedback timing, the first UE 905 may determine which PSFCH resources to monitor to enable the first UE 905 to receive the HARQ feedback for the sidelink communication (e.g., that is transmitted via a mini-slot).

As indicated above, FIGS. 9A-9D are provided as examples. Other examples may differ from what is described with respect to FIGS. 9A-9D.

FIG. 10 is a diagram illustrating an example process 1000 performed, for example, by a UE, in accordance with the present disclosure. Example process 1000 is an example where the UE (e.g., a UE 120, the first UE 905, and/or second UE 910) performs operations associated with sidelink feedback channel slot format for mini-slot channel access.

As shown in FIG. 10, in some aspects, process 1000 may include receiving an indication of a sidelink slot format, wherein the sidelink slot format indicates a configuration of sidelink feedback resources, and wherein the sidelink slot format is associated with a plurality of starting locations for a sidelink communication (block 1010). For example, the UE (e.g., using communication manager 140 and/or reception component 1102, depicted in FIG. 11) may receive an indication of a sidelink slot format, wherein the sidelink slot format indicates a configuration of sidelink feedback resources, and wherein the sidelink slot format is associated with a plurality of starting locations for a sidelink communication, as described above.

As further shown in FIG. 10, in some aspects, process 1000 may include measuring a signal associated with a channel access procedure, wherein the measurement of the signal indicates that the UE is permitted to access a sidelink channel, wherein the measurement of the signal occurs after a first symbol of a first sidelink slot and prior to a mini-slot of the first sidelink slot, and wherein the sidelink slot format indicates that the first sidelink slot is associated with the sidelink feedback resources (block 1020). For example, the UE (e.g., using communication manager 140 and/or measurement component 1108, depicted in FIG. 11) may measure a signal associated with a channel access procedure, wherein the measurement of the signal indicates that the UE is permitted to access a sidelink channel, wherein the measurement of the signal occurs after a first symbol of a first sidelink slot and prior to a mini-slot of the first sidelink slot, and wherein the sidelink slot format indicates that the first sidelink slot is associated with the sidelink feedback resources, as described above.

As further shown in FIG. 10, in some aspects, process 1000 may include transmitting, using a transmission starting location of the mini-slot of the first sidelink slot or of a symbol of a second sidelink slot, a sidelink communication based at least in part on the measurement of the signal, wherein a format of the sidelink feedback resources is based at least in part on the transmission starting location (block 1030). For example, the UE (e.g., using communication manager 140 and/or transmission component 1104, depicted in FIG. 11) may transmit, using a transmission starting location of the mini-slot of the first sidelink slot or of a symbol of a second sidelink slot, a sidelink communication based at least in part on the measurement of the signal, wherein a format of the sidelink feedback resources is based at least in part on the transmission starting location, as described above.

Process 1000 may include additional aspects, such as any single aspect or any combination of aspects described below and/or in connection with one or more other processes described elsewhere herein.

In a first aspect, the format of the sidelink feedback resources indicates that the sidelink feedback resources are included in the first sidelink slot based at least in part on the transmission starting location being the mini-slot of the first sidelink slot.

In a second aspect, alone or in combination with the first aspect, the format of the sidelink feedback resources indicates that a first one or more symbols of the first sidelink slot are associated with the sidelink feedback resources and a second one or more symbols of the first sidelink slot are associated with an AGC operation for a sidelink feedback channel.

In a third aspect, alone or in combination with one or more of the first and second aspects, the transmission starting location is the mini-slot of the first sidelink slot, and the format of the sidelink feedback resources indicates that the sidelink feedback resources are associated with a sidelink data channel based at least in part on the transmission starting location being the mini-slot of the first sidelink slot.

In a fourth aspect, alone or in combination with one or more of the first through third aspects, the transmission of the sidelink communication comprises transmitting data associated with the sidelink communication using one or more symbols associated with the sidelink feedback resources as indicated by the sidelink slot format.

In a fifth aspect, alone or in combination with one or more of the first through fourth aspects, the transmission starting location is in the symbol of the second sidelink slot based at least in part on the first sidelink slot being associated with the sidelink feedback resources.

In a sixth aspect, alone or in combination with one or more of the first through fifth aspects, process 1000 includes refraining from using the mini-slot of the first sidelink slot as the transmission starting location based at least in part on the first sidelink slot being associated with the sidelink feedback resources.

In a seventh aspect, alone or in combination with one or more of the first through sixth aspects, the transmission starting location is in the symbol of the second sidelink slot, and a timing associated with hybrid automatic repeat request feedback for the sidelink communication is based at least in part on the first symbol of the first sidelink slot.

In an eighth aspect, alone or in combination with one or more of the first through seventh aspects, the sidelink feedback resources are associated with a PSFCH.

In a ninth aspect, alone or in combination with one or more of the first through eighth aspects, the transmission starting location is the symbol of the second sidelink slot based on the first sidelink slot being associated with the sidelink feedback resources.

In a tenth aspect, alone or in combination with one or more of the first through ninth aspects, the transmission of the sidelink communication includes refraining, for the first sidelink slot, from using mini-slot scheduling based on the first sidelink slot being associated with the sidelink feedback resources.

In an eleventh aspect, alone or in combination with one or more of the first through tenth aspects, mini-slot access is disabled for the first sidelink slot based on the first sidelink slot being associated with the sidelink feedback resources, and the transmission starting location is the symbol of the second sidelink slot based on mini-slot access being disabled for the first sidelink slot.

In a twelfth aspect, alone or in combination with one or more of the first through eleventh aspects, an available transmission starting location for the first sidelink slot is the first symbol of the first sidelink slot based on the first sidelink slot being associated with the sidelink feedback resources.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
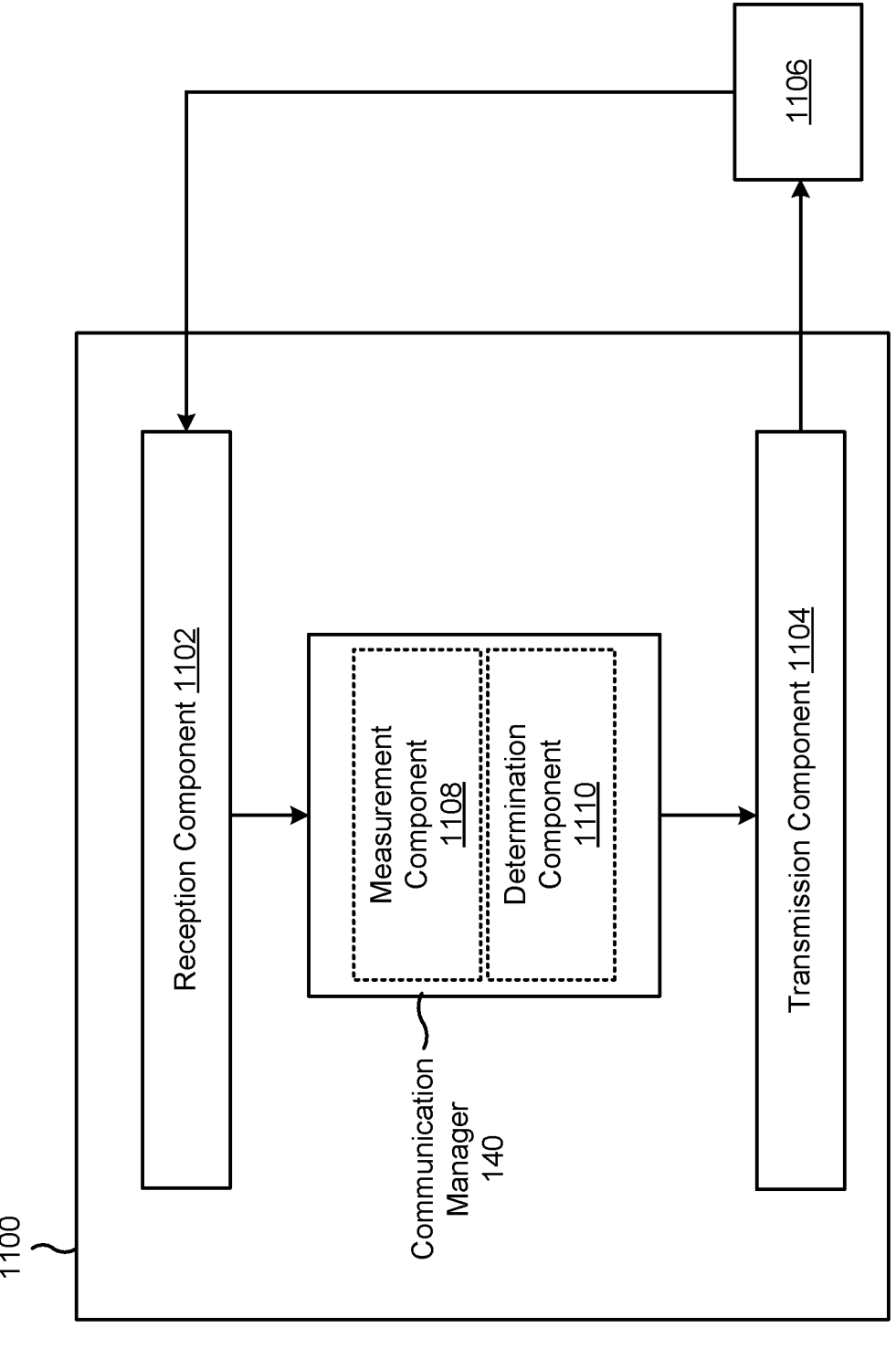
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a measurement component 1108, and/or a determination component 1110, among other examples.

In some aspects, the apparatus 1100 may be configured to perform one or more operations described herein in connection with FIGS. 9A-9D. Additionally, or alternatively, the apparatus 1100 may be configured to perform one or more processes described herein, such as process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive an indication of a sidelink slot format, wherein the sidelink slot format indicates a configuration of sidelink feedback resources, and wherein the sidelink slot format is associated with a plurality of starting locations for a sidelink communication. The measurement component 1108 may measure a signal associated with a channel access procedure, wherein the measurement of the signal indicates that the UE is permitted to access a sidelink channel, wherein the measurement of the signal occurs after a first symbol of a first sidelink slot and prior to a mini-slot of the first sidelink slot, and wherein the sidelink slot format indicates that the first sidelink slot is associated with the sidelink feedback resources. The transmission component 1104 may transmit, using a transmission starting location of the mini-slot of the first sidelink slot or of a symbol of a second sidelink slot, a sidelink communication based at least in part on the measurement of the signal, wherein a format of the sidelink feedback resources is based at least in part on the transmission starting location.

The determination component 1110 may refrain from using the mini-slot of the first sidelink slot as the transmission starting location based at least in part on the first sidelink slot being associated with the sidelink feedback resources.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
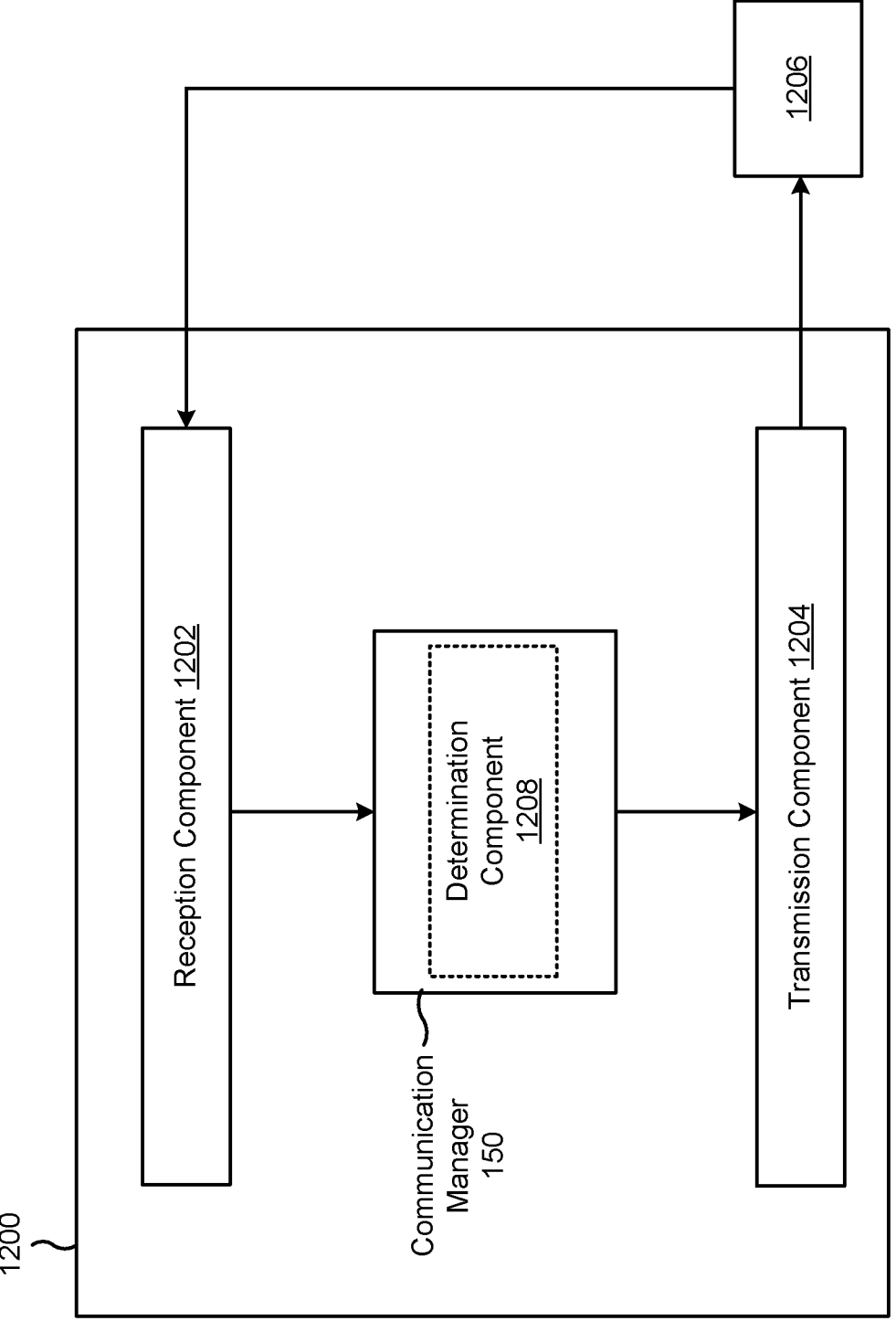
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a determination component 1208, among other examples.

In some aspects, the apparatus 1200 may be configured to perform one or more operations described herein in connection with FIGS. 9A-9D. Additionally, or alternatively, the apparatus 1200 may be configured to perform one or more processes described herein. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The transmission component 1204 may transmit an indication of a sidelink slot format, wherein the sidelink slot format indicates a configuration of sidelink feedback resources, and wherein the sidelink slot format is associated with a plurality of starting locations for a sidelink communication. The determination component 1208 may determine a format of the sidelink feedback resources based at least in part on a transmission starting location for a sidelink communication.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving an indication of a sidelink slot format, wherein the sidelink slot format indicates a configuration of sidelink feedback resources, and wherein the sidelink slot format is associated with a plurality of starting locations for a sidelink communication; measuring a signal associated with a channel access procedure, wherein the measurement of the signal indicates that the UE is permitted to access a sidelink channel, wherein the measurement of the signal occurs after a first symbol of a first sidelink slot and prior to a mini-slot of the first sidelink slot, and wherein the sidelink slot format indicates that the first sidelink slot is associated with the sidelink feedback resources; and transmitting, using a transmission starting location of the mini-slot of the first sidelink slot or of a symbol of a second sidelink slot, a sidelink communication based at least in part on the measurement of the signal, wherein a format of the sidelink feedback resources is based at least in part on the transmission starting location.

Aspect 2: The method of Aspect 1, wherein the format of the sidelink feedback resources indicates that the sidelink feedback resources are included in the first sidelink slot based at least in part on the transmission starting location being the mini-slot of the first sidelink slot.

Aspect 3: The method of Aspect 2, wherein the format of the sidelink feedback resources indicates that a first one or more symbols of the first sidelink slot are associated with the sidelink feedback resources and a second one or more symbols of the first sidelink slot are associated with an automatic gain control (AGC) operation for a sidelink feedback channel.

Aspect 4: The method of any of Aspects 1-3, wherein the transmission starting location is the mini-slot of the first sidelink slot, and wherein the format of the sidelink feedback resources indicates that the sidelink feedback resources are associated with a sidelink data channel based at least in part on the transmission starting location being the mini-slot of the first sidelink slot.

Aspect 5: The method of any of Aspects 1-4, wherein the transmission of the sidelink communication comprises: transmitting data associated with the sidelink communication using one or more symbols associated with the sidelink feedback resources as indicated by the sidelink slot format.

Aspect 6: The method of any of Aspects 1-5, wherein the transmission starting location is in the symbol of the second sidelink slot based at least in part on the first sidelink slot being associated with the sidelink feedback resources.

Aspect 7: The method of any of Aspects 1-6, further comprising: refraining from using the mini-slot of the first sidelink slot as the transmission starting location based at least in part on the first sidelink slot being associated with the sidelink feedback resources.

Aspect 8: The method of any of Aspects 1-7, wherein the transmission starting location is in the symbol of the second sidelink slot, and wherein a timing associated with hybrid automatic repeat request feedback for the sidelink communication is based at least in part on the first symbol of the first sidelink slot.

Aspect 9: The method of any of Aspects 1-8, wherein the sidelink feedback resources are associated with a physical sidelink feedback channel (PSFCH).

Aspect 10: The method of any of Aspects 1-9, wherein the transmission starting location is the symbol of the second sidelink slot based on the first sidelink slot being associated with the sidelink feedback resources.

Aspect 11: The method of any of Aspects 1-10, wherein the transmission of the sidelink communication comprises: refraining, for the first sidelink slot, from using mini-slot scheduling based on the first sidelink slot being associated with the sidelink feedback resources.

Aspect 12: The method of any of Aspects 1-11, wherein mini-slot access is disabled for the first sidelink slot based on the first sidelink slot being associated with the sidelink feedback resources, and wherein the transmission starting location is the symbol of the second sidelink slot based on mini-slot access being disabled for the first sidelink slot.

Aspect 13: The method of any of Aspects 1-12, wherein an available transmission starting location for the first sidelink slot is only the first symbol of the first sidelink slot based on the first sidelink slot being associated with the sidelink feedback resources.

Aspect 14: An apparatus for wireless communication at a device, comprising one or more processors; one or more memories coupled with the one or more processors; and instructions stored in the one or more memories and executable by the one or more processors to cause the apparatus to perform the method of one or more of Aspects 1-13.

Aspect 15: A device for wireless communication, comprising one or more memories and one or more processors coupled to the one or more memories, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by one or more processors to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:

receiving an indication of a sidelink slot format,
wherein the sidelink slot format indicates a configuration of sidelink feedback resources, and
wherein the sidelink slot format is associated with a plurality of starting locations that include a first symbol of a first sidelink slot and a second symbol of the first sidelink slot;

measuring a signal associated with a channel access procedure,
wherein the measurement of the signal indicates that the UE is permitted to access a sidelink channel,
wherein the measurement of the signal occurs after the first symbol of the first sidelink slot and prior to the second symbol of the first sidelink slot, and
wherein the sidelink slot format indicates that the first sidelink slot is associated with the sidelink feedback resources; and transmitting, using the second symbol of the first sidelink slot or a symbol of a second sidelink slot as a transmission starting location, a sidelink communication based at least in part on the measurement of the signal,
wherein a format of the sidelink feedback resources is based at least in part on the transmission starting location.

2. The method of claim 1, wherein the transmission starting location is the second symbol of the first sidelink slot, and wherein the format of the sidelink feedback resources indicates that the sidelink feedback resources are associated with a sidelink data channel based at least in part on the transmission starting location being the second symbol of the first sidelink slot.

3. The method of claim 1, wherein transmitting the sidelink communication comprises:

transmitting data associated with the sidelink communication using one or more symbols associated with the sidelink feedback resources as indicated by the sidelink slot format.

4. The method of claim 1, wherein the transmission starting location is in the symbol of the second sidelink slot based at least in part on the first sidelink slot being associated with the sidelink feedback resources.

5. The method of claim 1, further comprising:

refraining from using the second symbol of the first sidelink slot as the transmission starting location based at least in part on the first sidelink slot being associated with the sidelink feedback resources.

6. The method of claim 1, wherein transmitting the sidelink communication comprises:

refraining, for the first sidelink slot, from using mini-slot scheduling based on the first sidelink slot being associated with the sidelink feedback resources.

7. The method of claim 1, wherein mini-slot access is disabled for the first sidelink slot based on the first sidelink slot being associated with the sidelink feedback resources, and wherein the transmission starting location is the symbol of the second sidelink slot based on mini-slot access being disabled for the first sidelink slot.

8. The method of claim 1, wherein an available transmission starting location for the first sidelink slot is only the first symbol of the first sidelink slot based on the first sidelink slot being associated with the sidelink feedback resources.

9. The method of claim 1, wherein the transmission starting location is in the symbol of the second sidelink slot, and wherein a timing associated with hybrid automatic repeat request feedback for the sidelink communication is based at least in part on the first symbol of the first sidelink slot.

10. The method of claim 1, wherein the sidelink feedback resources are associated with a physical sidelink feedback channel (PSFCH).

11. A user equipment (UE) for wireless communication, comprising:

one or more antennas; and a processing system that includes one or more processors and one or more memories that store code and are coupled with the one or more processors, the processing system configured to cause the UE to:

receive an indication of a sidelink slot format, wherein the sidelink slot format indicates a configuration of sidelink feedback resources, and wherein the sidelink slot format is associated with a plurality of starting locations that include a first symbol of a first sidelink slot and a second symbol of the first sidelink slot;

measure a signal associated with a channel access procedure, wherein the measurement of the signal indicates that the UE is permitted to access a sidelink channel, wherein the measurement of the signal occurs after the first symbol of the first sidelink slot and prior to the second symbol of the first sidelink slot, and wherein the sidelink slot format indicates that the first sidelink slot is associated with the sidelink feedback resources; and transmit, using the second symbol of the first sidelink slot or a symbol of a second sidelink slot as a transmission starting location, a sidelink communication based at least in part on the measurement of the signal, wherein a format of the sidelink feedback resources is based at least in part on the transmission starting location.

12. The UE of claim 11, wherein the format of the sidelink feedback resources indicates that the sidelink feedback resources are included in the first sidelink slot based at least in part on the transmission starting location being the second symbol of the first sidelink slot.

13. The UE of claim 12, wherein the format of the sidelink feedback resources indicates that a first one or more symbols of the first sidelink slot are associated with the sidelink feedback resources and a second one or more symbols of the first sidelink slot are associated with an automatic gain control (AGC) operation for a sidelink feedback channel.

14. The UE of claim 11, wherein the transmission starting location is in the symbol of the second sidelink slot based at least in part on the first sidelink slot being associated with the sidelink feedback resources.

15. The UE of claim 11, wherein the one or more processors are further configured to:

refrain from using the second symbol of the first sidelink slot as the transmission starting location based at least in part on the first sidelink slot being associated with the sidelink feedback resources.

16. The UE of claim 11, wherein the transmission starting location is in the symbol of the second sidelink slot, and wherein a timing associated with hybrid automatic repeat request feedback for the sidelink communication is based at least in part on the first symbol of the first sidelink slot.

17. The UE of claim 11, wherein the one or more processors, to transmit the sidelink communication, are configured to:

refrain, for the first sidelink slot, from using mini-slot scheduling based on the first sidelink slot being associated with the sidelink feedback resources.

18. The UE of claim 11, wherein mini-slot access is disabled for the first sidelink slot based on the first sidelink slot being associated with the sidelink feedback resources, and wherein the transmission starting location is the symbol of the second sidelink slot based on mini-slot access being disabled for the first sidelink slot.

19. The UE of claim 11, wherein an available transmission starting location for the first sidelink slot is only the first symbol of the first sidelink slot based on the first sidelink slot being associated with the sidelink feedback resources.

20. The UE of claim 11, wherein the sidelink feedback resources are associated with a physical sidelink feedback channel (PSFCH).

21. A non-transitory computer-readable medium storing a set of instructions for wireless communication, the set of instructions comprising:

one or more instructions that, when executed by one or more processors of a user equipment (UE), cause the UE to:

receive an indication of a sidelink slot format, wherein the sidelink slot format indicates a configuration of sidelink feedback resources, and wherein the sidelink slot format is associated with a plurality of starting locations that include a first symbol of a first sidelink slot and a second symbol of the first sidelink slot;

measure a signal associated with a channel access procedure, wherein the measurement of the signal indicates that the UE is permitted to access a sidelink channel, wherein the measurement of the signal occurs after the first symbol of the first sidelink slot and prior to the second symbol of the first sidelink slot, and wherein the sidelink slot format indicates that the first sidelink slot is associated with the sidelink feedback resources; and transmit, using the second symbol of the first sidelink slot or a symbol of a second sidelink slot as a transmission starting location, a sidelink communication based at least in part on the measurement of the signal, wherein a format of the sidelink feedback resources is based at least in part on the transmission starting location.

22. The non-transitory computer-readable medium of claim 21, wherein the one or more instructions, that cause the UE to transmit the sidelink communication, cause the UE to:

transmit data associated with the sidelink communication using one or more symbols associated with the sidelink feedback resources as indicated by the sidelink slot format.

23. The non-transitory computer-readable medium of claim 21, wherein the transmission starting location is in the symbol of the second sidelink slot based at least in part on the first sidelink slot being associated with the sidelink feedback resources.

24. The non-transitory computer-readable medium of claim 21, wherein the one or more instructions further cause the UE to:

refrain from using the second symbol of the first sidelink slot as the transmission starting location based at least in part on the first sidelink slot being associated with the sidelink feedback resources.

25. The non-transitory computer-readable medium of claim 21, wherein the sidelink feedback resources are associated with a physical sidelink feedback channel (PSFCH).

26. An apparatus for wireless communication, comprising:

means for receiving an indication of a sidelink slot format, wherein the sidelink slot format indicates a configuration of sidelink feedback resources, and wherein the sidelink slot format is associated with a plurality of starting locations that include a first symbol of a first sidelink slot and a second symbol of the first sidelink slot;

means for measuring a signal associated with a channel access procedure, wherein the measurement of the signal indicates that the apparatus is permitted to access a sidelink channel, wherein the measurement of the signal occurs after the first symbol of the first sidelink slot and prior to the second symbol of the first sidelink slot, and wherein the sidelink slot format indicates that the first sidelink slot is associated with the sidelink feedback resources; and means for transmitting, using the second symbol of the first sidelink slot or a symbol of a second sidelink slot as a transmission starting location, a sidelink communication based at least in part on the measurement of the signal, wherein a format of the sidelink feedback resources is based at least in part on the transmission starting location.

27. The apparatus of claim 26, wherein the transmission starting location is in the symbol of the second sidelink slot based at least in part on the first sidelink slot being associated with the sidelink feedback resources.

28. The apparatus of claim 26, further comprising:

means for refraining from using the second symbol of the first sidelink slot as the transmission starting location based at least in part on the first sidelink slot being associated with the sidelink feedback resources.

29. The apparatus of claim 26, wherein the transmission starting location is in the symbol of the second sidelink slot, and wherein a timing associated with hybrid automatic repeat request feedback for the sidelink communication is based at least in part on the first symbol of the first sidelink slot.

30. The apparatus of claim 26, wherein the sidelink feedback resources are associated with a physical sidelink feedback channel (PSFCH).

* * * * *